United States Patent
Lin et al.

(10) Patent No.: US 11,253,783 B2
(45) Date of Patent: Feb. 22, 2022

(54) METHOD FOR TRAINING AI BOT IN COMPUTER GAME

(71) Applicant: Kabushiki Kaisha Ubitus, Tokyo (JP)

(72) Inventors: Chiu-Chou Lin, New Taipei (TW); Ying-Hau Wu, Taipei (TW); Kuan-Ming Lin, Taipei (TW); PeiWen Huang, Taipei (TW); I-Chen Wu, Hsinchu County (TW); Cheng-Lun Tsai, New Taipei (TW)

(73) Assignee: Kabushiki Kaisha Ubitus

( * ) Notice: Subject to any disclaimer, the term of this patent is extended or adjusted under 35 U.S.C. 154(b) by 12 days.

(21) Appl. No.: 16/747,403

(22) Filed: Jan. 20, 2020

(65) Prior Publication Data

US 2020/0238178 A1 Jul. 30, 2020

Related U.S. Application Data

(63) Continuation of application No. 62/796,174, filed on Jan. 24, 2019.

(51) Int. Cl.
*A63F 13/67* (2014.01)

(52) U.S. Cl.
CPC .................. *A63F 13/67* (2014.09)

(58) Field of Classification Search
CPC ....................................................... A63F 13/67
See application file for complete search history.

(56) References Cited

U.S. PATENT DOCUMENTS

2019/0286979 A1* 9/2019 Harmer ................ G06N 3/0445

OTHER PUBLICATIONS

Horgan et al, Distributed Prioritized Experience Replay (2018), ICLR (Year: 2018).*
Mnih et al, Asynchronous Methods for Deep Reinforcement Learning (2018), arxiv.org (Year: 2016).*

* cited by examiner

*Primary Examiner* — Kang Hu
*Assistant Examiner* — Thomas H Henry

(57) ABSTRACT

The invention discloses a pure end-to-end deep reinforcement learning for training car racing game AI bot that uses only the velocity information extracted from screen for both training and testing phases without using any internal state from game environment, such as the car facing angle. The learned AI bot can play better than the average performance of human players. In addition, the reward function is designed to consist only the velocity value, and use Ape-X distributed training framework combined with a variant of Deep Q Network to solve the sparse training signal problem caused by the reward function of an original design. Moreover, limit learner rate method is designed that improves the training efficiency and training performance. The AI bot trained in this way can achieve performance beyond the average human level and reach a level close to professional players.

11 Claims, 15 Drawing Sheets

Slow velocity        Normal velocity        High velocity

METHOD FOR TRAINING AI BOT IN COMPUTER GAME

BACKGROUND OF INVENTION

1. Field of the Invention

The invention relates to a method for training AI (artificial intelligence) bot in computer game, especially refers to a method that decouples the learning environment and the AI training agents, and uses an Ape-X distributed training framework combined with a variant of Deep Q Network to train the AI robot in the computer game.

2. Description of the Prior Art

During the past years, online games have become more and more popular all over the world. With the development of cloud computing related systems and technologies, a technology for allowing a server to stream the video game contents to provide online gaming services across the internet has been introduced. According to the video games, building video game AI bots is very important and beneficial for both game companies and human players. In the view of game companies, video game AI bots can help them to find the weakness and verify the fairness of the game design. In the view of players, video game AI bots can play and compete with human players, which can increase their willingness. Because most of video games, such as car racing games or First Person Shooting (FPS) games, require multiple players to play together. Unfortunately, there are not many people online during off-peak hours or in new games. In this work, we focus on training AI bot for car racing games.

Currently, end-to-end training is the most popular concept and the goal for most of deep learning methods. It means that the learning algorithm can directly use raw observations for training without any modification or other human delicate design. Recently, some end-to-end solutions for car racing game AI bot like "Reference [3]" and "Reference [4]" (see references listed at the end of specification) have the ability to decide the action using only raw observations. However, they still need to use the game internal states, such as car facing angle or the distance from the middle of the road. However, these kind of internal states are not easy to obtain in most of car racing games without owing and modifying the source codes of the game program.

Therefore, in order to obtain such internal states of the game during the training process of AI bot, the aforementioned prior arts always need to modify the game program; in addition, conventional AI bot training processes also need to run local games, online game clients, or simulators inside the AI training agent/actor. The disadvantages of this configuration could be: (a) the efforts to integrate between agent and the learning environment is larger; (b) the numbers of learning environment and agent/actor should be the same; (c) the agent/actor tends to crash if the learning environment crashes; and (d) resource utilization such as CPU bound, GPU bound, and I/O bound modules have to be run on the same machine, which is harder to scale.

Moreover, although some AI training methods based on Neural Network technologies have been developed, such like Deep Q Network (DQN) "Reference [1]" and Ape-X algorithm "Reference [2]", however, there is one disadvantage of the original Ape-X algorithm: if there is no enough computing power to be actors and playing games at the same time, the sample generation will be too slow and the learner will tend to overfit with the current data, and this will result in worse model or increase convergent time.

SUMMARY OF THE INVENTION

Accordingly, it is the primary objective of the present invention to provide a method for training AI bot in computer game, which decouples the learning environment (such as playing environment of cloud game or its simulator) and the AI training agent. This improves flexibility as well as stabilities of the whole system. In this case, the learning environment and the AI training agent can both run together or run across different processes, different devices, or even different locations. It is possible to implement in different technologies such as programming languages, OS, hardware or software architecture between the learning environment and the AI training agent. Moreover, the natural architecture of the learning environment can switch players between human beings and AI bots, and even allow the human players and the AI bots to play together during the training process of these AI bots.

Another objective of the present invention is to provide a method for training AI bot in computer game, which uses an Ape-X distributed training framework combined with a variant of Deep Q Network in order to achieve the following features: (a) adding a new parameter to control learning speed, for instance, pausing learner and waiting for actors to generate enough new data in a predefined time period; and (b) limited frames per second generated by the data source to prevent too many similar screens to be processed so as to save un-necessary computing power.

In order to achieve the aforementioned objects, the invention provides a method for training AI bot in computer game, comprising:

executing a gaming application in a server; said executed gaming application generating a playing environment which is capable of accepting at least a player client to connect to the playing environment via a communicating network; said playing environment being able to receive a player command from the player client, generate a first gaming output according to the received player command, and transmit said first gaming output to the player client via the communicating network;

executing an AI (artificial intelligence) training application; said AI training application comprising at least one actor module and an AI learner module; wherein, when said AI training application is executed, each said actor module generates an AI client for connecting to the playing environment and sending an AI playing command to the playing environment generated by said gaming application, and said playing environment generates a second gaming output according to the AI playing command and sends the second gaming output to the actor module;

said AI learner module executing an AI training process which retrieves said second gaming output from the actor module and uses said second gaming output as an input of the AI training process and then generates a feedback command according to the input; said actor module accepting said feedback command from said AI learner module and generating said AI playing command according to the said feedback command; and then, said generated AI playing command being sent to the playing environment in order to generate another said second gaming output to be input to the AI training process again as a training loop for training the AI client;

wherein, said AI training application is independent from the gaming application and can be executed without the need to modify the gaming application nor obtain additional data from the gaming application other than the second gaming output; moreover, a format of the second gaming output is exactly the same as the format of the first gaming output.

In a preferred embodiment, said first and second gaming outputs both comprise perceiving rendered observations which are transmitted as a video stream containing a plurality of image frames; said AI learner module analyzes the image frames in order to obtain parameters required for proceeding with the AI training process.

In a preferred embodiment, said gaming application is an application of a car racing game; said AI learner module analyzes the image frames in order to obtain at least a velocity data and an accelerating status data of car; said AI training process uses said velocity data as the input of the AI training process in order to train the AI client to achieve a higher average velocity of car during the car racing game.

In a preferred embodiment, said playing environment is able to be connected by both the player client and the AI client in the same time, such that the player client and the AI client can play in the playing environment in the same time while the AI training process is still running for training the AI client.

In a preferred embodiment, said playing environment is able to be connected by the AI client without any said player client being connected, such that the AI training process is executed for training the AI client in a condition without any said player client being connected in the same playing environment.

In a preferred embodiment, in addition to said second gaming output, said first gaming output is also fed to the AI learner module as the input of the AI training process for training the AI client.

In a preferred embodiment, there are two or more gaming applications being executed in the server for generating two or more said playing environments; in addition, said AI training application comprises two or more said actor modules; each said actor module connecting to a corresponding said playing environment, sending said AI playing command to said corresponding playing environment, and receiving said second gaming output from said corresponding playing environment; said AI learner module retrieving said second gaming outputs from the actor modules and uses said second gaming outputs as inputs of the AI training process.

In a preferred embodiment, said AI training process includes an Ape-X distributed training framework combined with a variant of Deep Q Network; the AI training application comprises two or more actor modules; said AI training application further comprises a replay module and a storage; said storage receives and stores experience data generated by each said actor module according to the second gaming output in an experience accepting rate; said replay module generates samples of the experience data stored in the storage, and sends said generated samples to the AI learner module as said input of the AI training process in a sampling rate controlled by the replay module; wherein said sampling rate is a multiple of total experience accepting rates of said actor modules.

In a preferred embodiment, when the sampling rate is higher than the multiple of total experience accepting rates, the replay module temporary pauses the generation of samples in order to decrease the sampling rate until the sampling rate is equal to the multiple of total experience accepting rates again.

In a preferred embodiment, the gaming application for generating the playing environment and the AI training application for generating the AI client are decoupled from each other All these objects are achieved by the method and system for training AI bot in computer game in accordance with the present invention described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method for training AI bot in computer game. The method of the invention refers to a pure end-to-end deep reinforcement learning for training car racing game AI bot that uses only the velocity information extracted from screen for both training and testing phases without using any internal state from game environment, such as the car facing angle. The learned AI bot can play better than the average performance of human players. In addition, the reward function is designed to consist only the velocity value, and use Ape-X distributed training framework combined with a variant of Deep Q Network to solve the sparse training signal problem caused by the reward function of an original design. Moreover, limit learner rate method is designed that improves the training efficiency and training performance. The AI bot trained in this way can achieve performance beyond the average human level and reach a level close to professional players.

Figure 1:
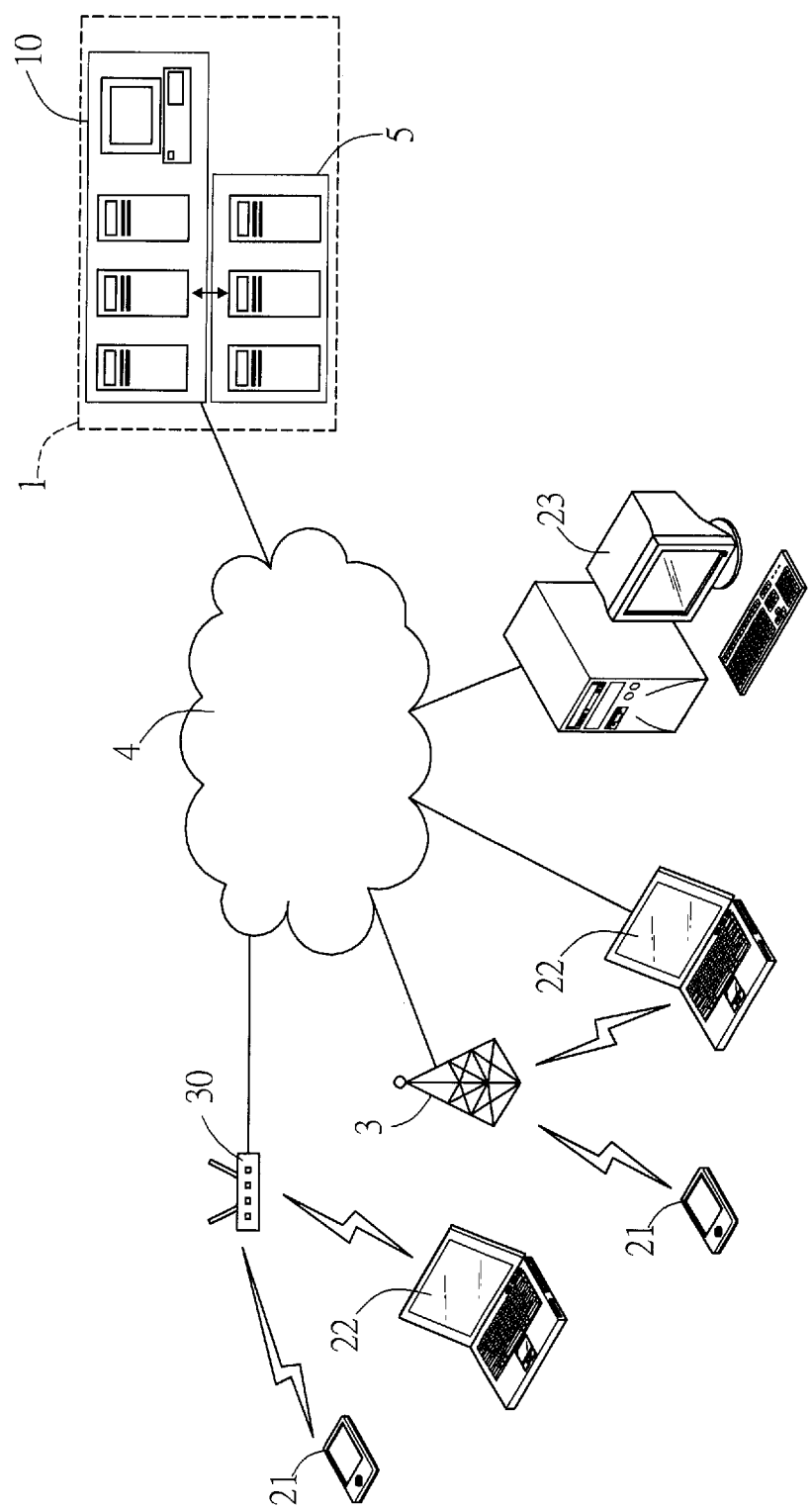
FIG. 1 schematically illustrates a system for performing the method for training AI bot in computer game in accordance with the present invention.

Please refer to FIG. 1, which schematically illustrates a system for performing the method for training AI bot in computer game in accordance with the present invention. A server 10 is furnished at a sever side 1 for providing the service of a gaming application executed on the server 10, such service can be, but not limited to, a cloud-based online video game service. A plurality of client devices 21, 22, 23 can connect (log in) to the server 10 via a communicating network 4 to use the service provided by the gaming application running on the server 10. In this embodiment, the communicating network 4 is Internet, and the client devices 21, 22, 23 can be any electronic device having the ability to access the Internet, such like (but not limited to) a smart phone 21, a digital tablet, a notebook 22, a desktop computer 23, a video game player, a set top box, or even a smart TV. Some of the client devices 21, 22 are connected wirelessly to the communicating network 4 by means of a mobile station 3 or a wireless router 30, some others can be connected to the communicating network 4 through a router in a wired manner. The gaming application running on the server 1 generates a virtual gaming environment containing a plurality of 2D or 3D objects as well as AI bots or NPCs (Non-Player Characters) that can interact or even compete with human players. Human players can operate these client devices 21, 22 to connect with the sever 10 and log in the virtual gaming environment generated by the gaming application in order to enjoy the gaming services provided by the gaming application.

In the present invention, one or more AI client devices 5 are furnished in order to performing training process of the AI bots contained in the gaming environment generated by the gaming application. In this embodiment, although these AI client devices 5 are located in the sever side 1 nearby the server 10 as shown in FIG. 1, however, it is notable that, the AI client devices 5 of the invention can also be either located at any other place remote from the server 10 and connected with the server 10 via the communicating network 4 or even furnished in the same machine of the sever 10.

Figure 2:
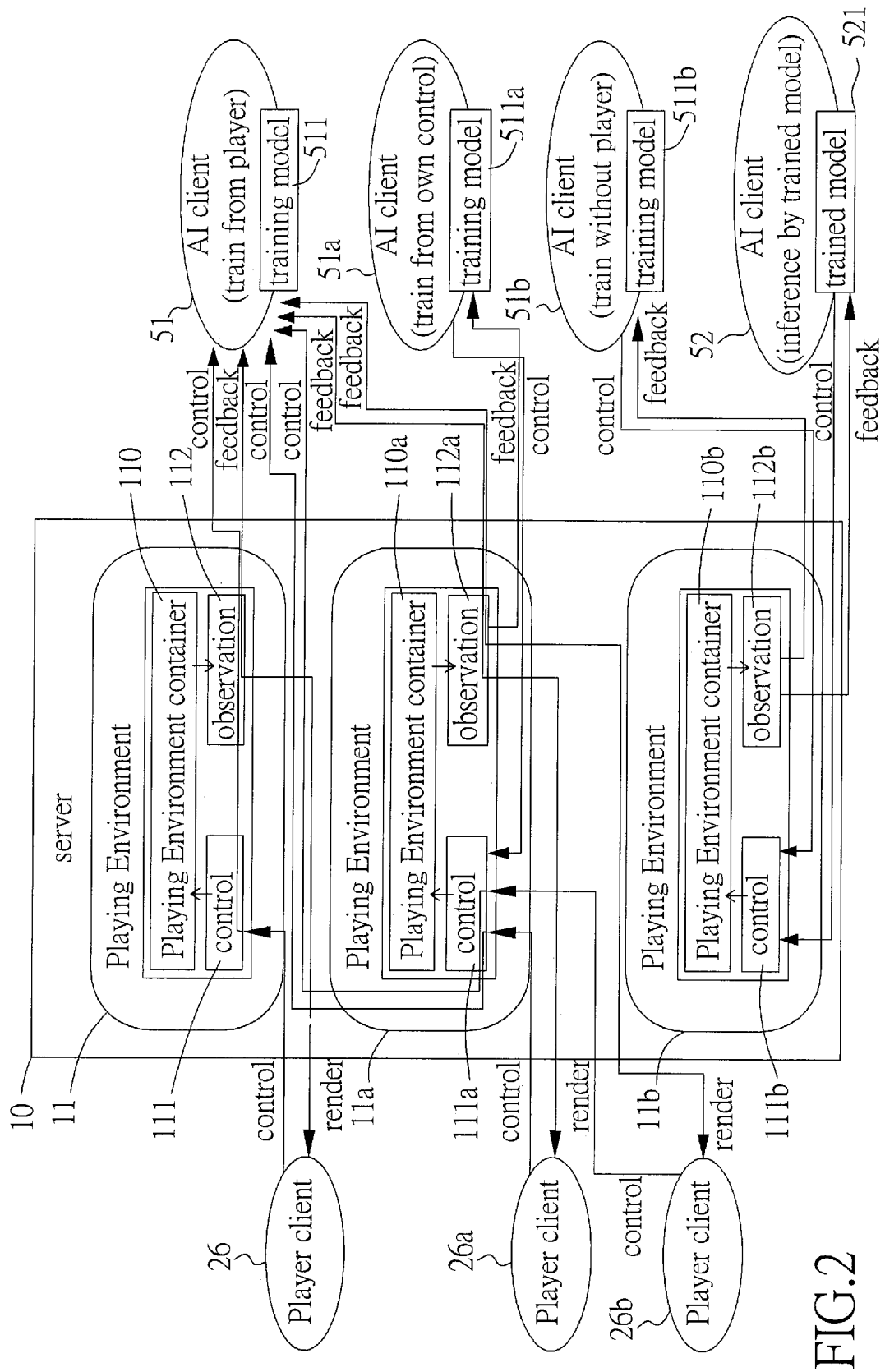
FIG. 2 is a schematic diagram showing several embodiments of the configuration of system for training AI bot in computer game in accordance with the present invention.

FIG. 2 is a schematic diagram showing several embodiments of the configuration of system for training AI bot in computer game in accordance with the present invention. In the system shown in FIG. 2, one or more gaming applications can be executed in the server 10. Each executed gaming application generating a playing environment 11, 11a, 11b which is capable of accepting at least a player client 26, 26a, 26b to connect to the playing environment 11, 11a, 11b via the communicating network (e.g., Internet or LAN). Each playing environment 11, 11a, 11b includes a playing environment container 110, 110a, 110b equipped with a control interface 111, 111a, 111b and an observation interface 112, 112a, 112b. Each playing environment 11, 11a, 11b is able to receive a player command (e.g., control command) from one or more player clients 26, 26a, 26b via the control interface 111, 111a, 111b, generate a first gaming output (e.g., rendered video stream) according to the received player command, and transmit the first gaming output to the player client 26, 26a, 26b via the observation interface 112, 112a, 112b and the communicating network. In this embodiment, the first gaming output comprises perceiving rendered observations which are transmitted as a video stream containing a plurality of image frames. The player client 26, 26a, 26b receives the first gaming output and then decodes and plays the image frames of the video stream onto the screen of the player client device 21, 22, 23.

In addition, one or more AI (artificial intelligence) training applications are executed in one or more AI client devices 5. Each executed AI training application generates an AI client 51, 51a, 51b for connecting to one or more playing environments 11, 11a, 11b generated by the gaming applications. Each AI client 51, 51a, 51b generates and controls a virtual AI bot which can play within the connected playing environment, and includes a training model 511, 511a, 511b for proceeding with the training process of the AI bot. The AI bot controlled by the training model 511, 511a, 511b of the AI client 51, 51a, 51b can play like a play client 26, 26a, 26b controlled by a human being in the playing environments 11, 11a, 11b without the need to obtain nor modify the source codes of the gaming application. Which means, the control commands generated by the training model 511, 511a, 511b of the AI client 51, 51a, 51b should be in the same format as the player commands generated by the player client 26, 26a, 26b. In addition, the gaming outputs received by the training model 511, 511a, 511b of the AI client 51, 51a, 51b should also be in the same format as the first gaming output received by the player client 26, 26a, 26b. That is, in the view of the playing environment, the formats and kinds of activities, control commands and gaming outputs of the AI client 51, 51a, 51b are the same as a normal player client controlled by a human player. Furthermore, the training model 511, 511a, 511b of the AI client 51, 51a, 51b must be able to acquire sufficient data (such like parameters) merely from the received gaming outputs (e.g., rendered video stream) in order to proceed with the training process of the AI bot. Such novel arrangement makes it possible to decouple the learning environment (i.e., playing environment) and the AI training agent (i.e., training model of AI client). This improves flexibility as well as stabilities of the whole system. In this case, the learning environment and the AI training agent can both run together or run across different processes, different devices, or even different locations. It is possible to implement in different technologies such as programming languages, OS, hardware or software architecture between the learning environment and the AI training agent. Moreover, the natural architecture of the learning environment can switch players between human beings and AI bots, and even allow the human players and the AI bots to play together during the training process of these AI bots.

As shown in FIG. 2, in the first embodiment of the configuration of system in accordance with the invention, the playing environment 11 is connected by both the player client 26 and the AI client 51 in the same time. In the meantime, another playing environment 11a is connected by another player client 26a and the same AI client 51 in the same time. Which means, the AI client 51 is connected to two different playing environments 11, 11a simultaneously. The player client 26 generates and sends the player command (e.g., control command) to the control interface 111 of the playing environment 11 in order to enjoy the game service provided by the playing environment 11, and the playing environment 11 generates the first gaming output (e.g., rendered video stream) according to the received player command, and sends the first gaming output to the player client 26 for being displayed on a screen of the player client device. Similarly, the other player client 26a also generates and sends its player command (e.g., control command) to the control interface 111a of the other playing environment 11a in order to enjoy the game service provided by the playing environment 11a, and the playing environment 11a also generates its first gaming output (e.g., rendered video stream) according to the received player command, and sends the first gaming output to the player client 26a. In this embodiment, the AI client 51 connected to both the playing environments 11, 11a does not generate its own control commands. Contrary, the training model 511 of the AI client 51 retrieves the player commands and the first gaming outputs from both the playing environments 11, 11a, and uses the retrieved first gaming outputs as the inputs and uses the retrieved player commands as the feedbacks for performing the training process of AI bot. Which means, in this first embodiment, the AI bot of the AI client 51 is trained by using human player's activities and playing experiences.

In the second embodiment of the configuration of system in accordance with the invention shown in FIG. 2, the playing environment 11a is connected by both the player client 26a and the AI client 51a in the same time. The training model 511a of the AI client 51a generates and transmits its control command to the control interface 111a of the playing environment 11a. The playing environment 11a generates a second gaming output according to the control command, and transmit the second gaming output via the observation interface 112a back to the training model 511a of the AI client 51a. The training model 511a of the AI client 51a uses the second gaming output as the input of the training process for training the AI bot, and uses the feedback of the training process as the control command for controlling the AI bot within the playing environment 11a. Such that, the player client 26a and the AI client 51a can play in the playing environment 11a in the same time while the AI training process is still running in the training model 511a for controlling and training the AI client 51a which is currently playing. Which means, in this second embodiment, the AI bot of the AI client 51a is trained by using its own controls and playing experiences.

In the third embodiment of the configuration of system in accordance with the invention shown in FIG. 2, the playing environment 11b is connected with two different AI clients 51b, 52 and is not connected with any player client. Wherein, the AI client 52 is equipped with a trained model 521 for generating and sending control commands to the control interface Ill b of the playing environment 11b and receiving the second gaming output from the observation interface 112b. The AI client 52 substantially generates a trained AI bot to play the game provided by the playing environment 11b. In the meantime, the other training model 511b of the AI client 51b generates and transmits its own control command to the control interface 111b of the playing environment 11b. The playing environment 11b generates the second gaming output according to the control command of the training model 511b, and transmit the second gaming output via the observation interface 112b back to the training model 511b of the AI client 51b. The training model 511b of the AI client 51b uses the second gaming output as the input of the training process for training the AI bot, and uses the feedback of the training process as the control command for controlling the AI bot within the playing environment 11b. Such that, the already-trained AI hot of the AI client 52 and the to-be-trained AI bot of the AI client 51b can play together in the playing environment 11b in the same time while the AI training process is still running in the training model 511b for controlling and training the AI client 51b. Which means, in this third embodiment, the AI bot of the AI client 51a is trained by using its own controls and playing experiences, but is interfered by other trained AI bots. In this embodiment, because no player client is involved, AI clients can collect feedback data from observations without rendering, and thus accelerates the training process of AI bot.

In addition to the embodiments illustrated above, there are some other embodiments of the configuration of system in accordance with the invention which are not shown in FIG. 2. For example, the playing environment can be connected by the to-be-trained AI client without any player client nor other already-trained AI client being connected, such that the AI training process is executed for training the AI client in a condition without any said player client nor other already-trained AI client being connected in the same playing environment. In yet another embodiment, in addition to the second gaming output of the AI client, the first gaming output of the player client is also fed to the same AI learner module of the AI client as the input of the AI training process for training the AI client. Such that the AI bot of the AI client is trained by using both its own controls and playing experiences and the human player's activities and playing experiences.

Figure 3:
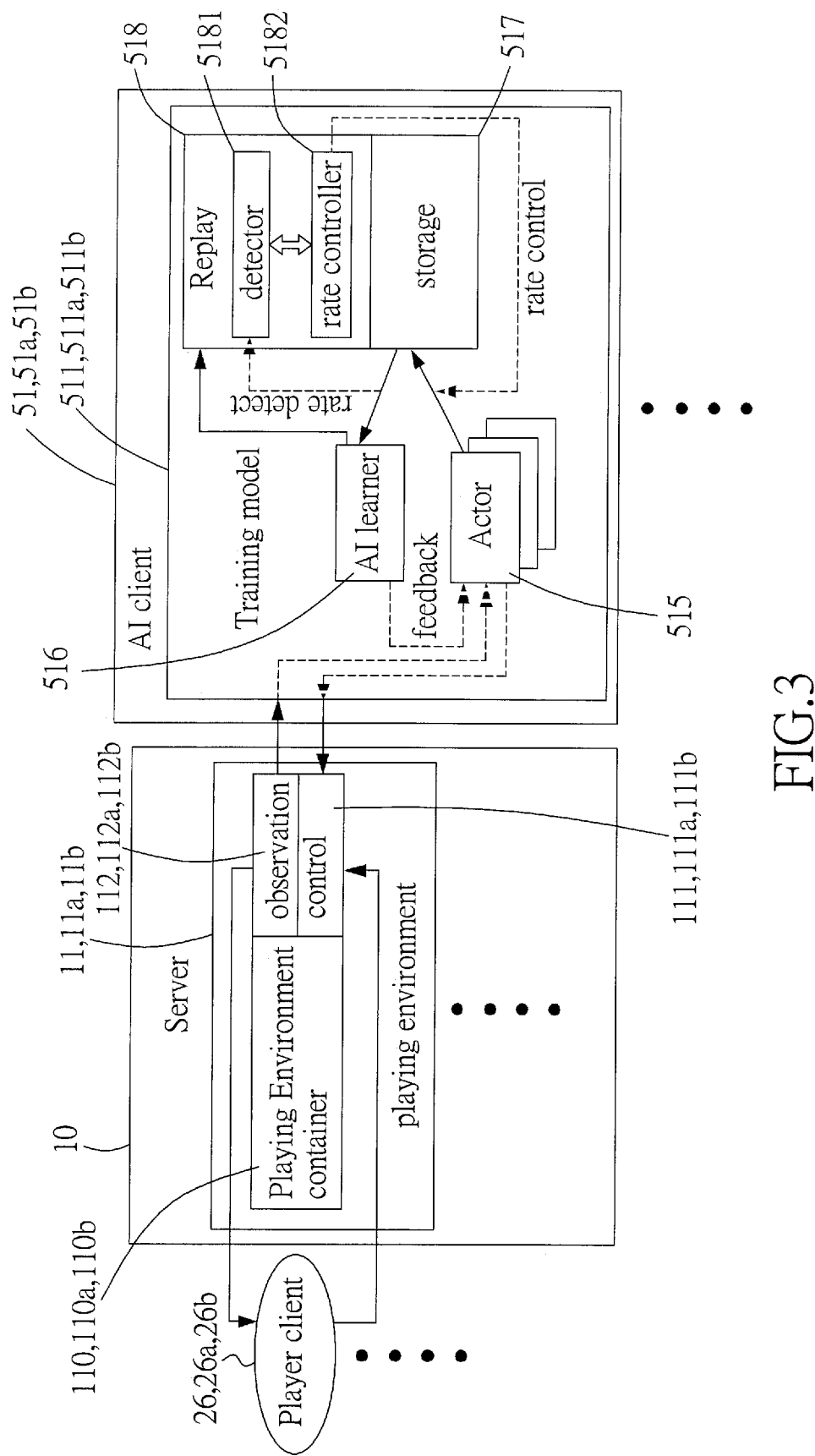
FIG. 3 is a schematic diagram showing an embodiment of an improved architecture design of a training model of the AI client in accordance with the present invention.

Please refer to FIG. 3, which is a schematic diagram showing an embodiment of an improved architecture design of a training model of the AI client in accordance with the present invention. In this embodiment, the training model 5111, 511a, 511b of each AI client 51, 51a, 51b comprises one or more actor modules 515, an AI learner module 516 and a replay module 518 connected with a storage 517. When one or more AI training applications are executed in the server 10 to generate one or more playing environments 11, 11a, 11b, each actor module 515 generates an AI client for connecting to a corresponding playing environment 11, 11a, 11b and sending AI playing commands to the playing environment 11, 11a, 11b via the control interface 111, 111a, 111b of the gaming application 11, 11a, 11b. The playing environment 11, 11a, 11b generates a second gaming output according to the AI playing commands and sends the second gaming outputs to the actor modules 515 via the observation interface 112, 112a, 112b. The AI learner module 516 executes an AI training process which retrieves the second gaming outputs from the actor modules 515 and uses the second gaming outputs as inputs of the AI training process and then generates feedback commands according to the inputs. The actor modules 515 accept the feedback commands from the AI learner module 616 and generates the AI playing commands according to the feedback commands. And then, the generated AI playing commands are sent to the playing environment 11, 11a, 11b in order to generate subsequent second gaming outputs to be input to the AI training process again as a training loop for training the AI clients. Wherein, the AI training process uses Neural Network and Deep Reinforcement Learning technologies to train the AI bots of the AI clients. In the present invention, the AI training application is independent from the gaming application and can be executed without the need to modify the gaming application nor obtain additional data from the gaming application other than the second gaming output; moreover, a format of the second gaming output is exactly the same as the format of the first gaming output which is generated by the gaming application according to human player's (i.e., the player clients 26, 26a, 26b) activities.

In the embodiment shown in FIG. 3, the AI training process includes an Ape-X distributed training framework combined with a variant of Deep Q Network. The storage 517 receives and stores experience data generated by each actor module 515 according to the second gaming outputs in an experience accepting rate. The replay module 518 generates samples from the experience data stored in the storage 517, and sends these generated samples to the AI learner module 516 as the inputs of the AI training process in a sampling rate controlled by the replay module 518. The experience accepting rate and the sampling rate are detected by a detector module 5181 and controlled by a rate controller module 5182 built-in the replay module 518. In this embodiment, the sampling rate should be a multiple of total experience accepting rates of those actor modules 515. It is noted that, although the AI training process of this preferred embodiment uses an Ape-X distributed training framework combined with a variant of Deep Q Network, however, the AI training process of the invention can also work well in ordinary Deep Q Networks, and is not limited to the use of Ape-X.

Figure 4:
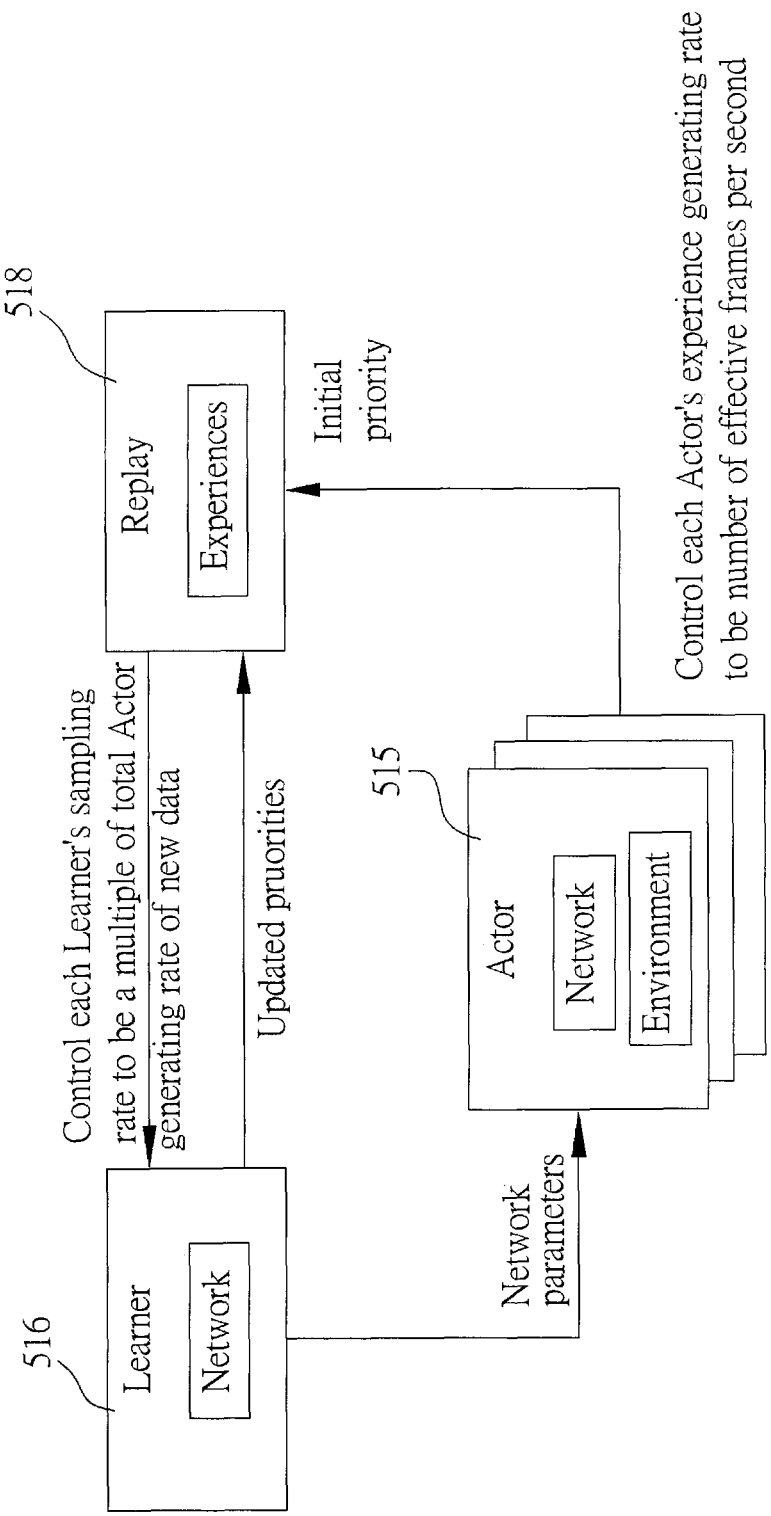
FIG. 4 is a diagram schematically illustrating an embodiment of data flows inside the training model of the AI client in accordance with the present invention.

Please refer to FIG. 4, which is a diagram schematically illustrating an embodiment of data flows inside the training model of the AI client in accordance with the present invention. It is understood that, the experience generating rate is proportional to the image frame generating rate (i.e., frames per second, FPS) of each actor module 515. If the experience generating rate (FPS) is too high (for example, 120 FPS or even higher), then the difference between the consequent frames (consequent experiences) will be minor, and the loading of the AI learner module 516 will be huge, but the learning efficiency and accuracy will be lowered. Therefore, the invention employs the replay module 518 to detect and control the experience accepting rate (i.e., the rate for the replay module 518 to accept the experiences generated by the actor module) to a predetermined range or value by directly discarding or ignoring some of the received experiences (image frames) without saving them into the storage. In the other hand, if the sampling rate of generated samples is higher than the multiple of total experience accepting rates of the updated experiences, the replay module 518 will tend to generate several samples from the same experience (image frame), which also causes increased loading of the AI learner module 516, and lowered efficiency and accuracy of the AI bot learning. Therefore, when the sampling rate is higher than the multiple of total experience accepting rates, the replay module 518 of the invention will temporary pause the generation of samples in order to decrease the sampling rate until the sampling rate is equal to the multiple of total experience accepting rates again.

Figure 5:
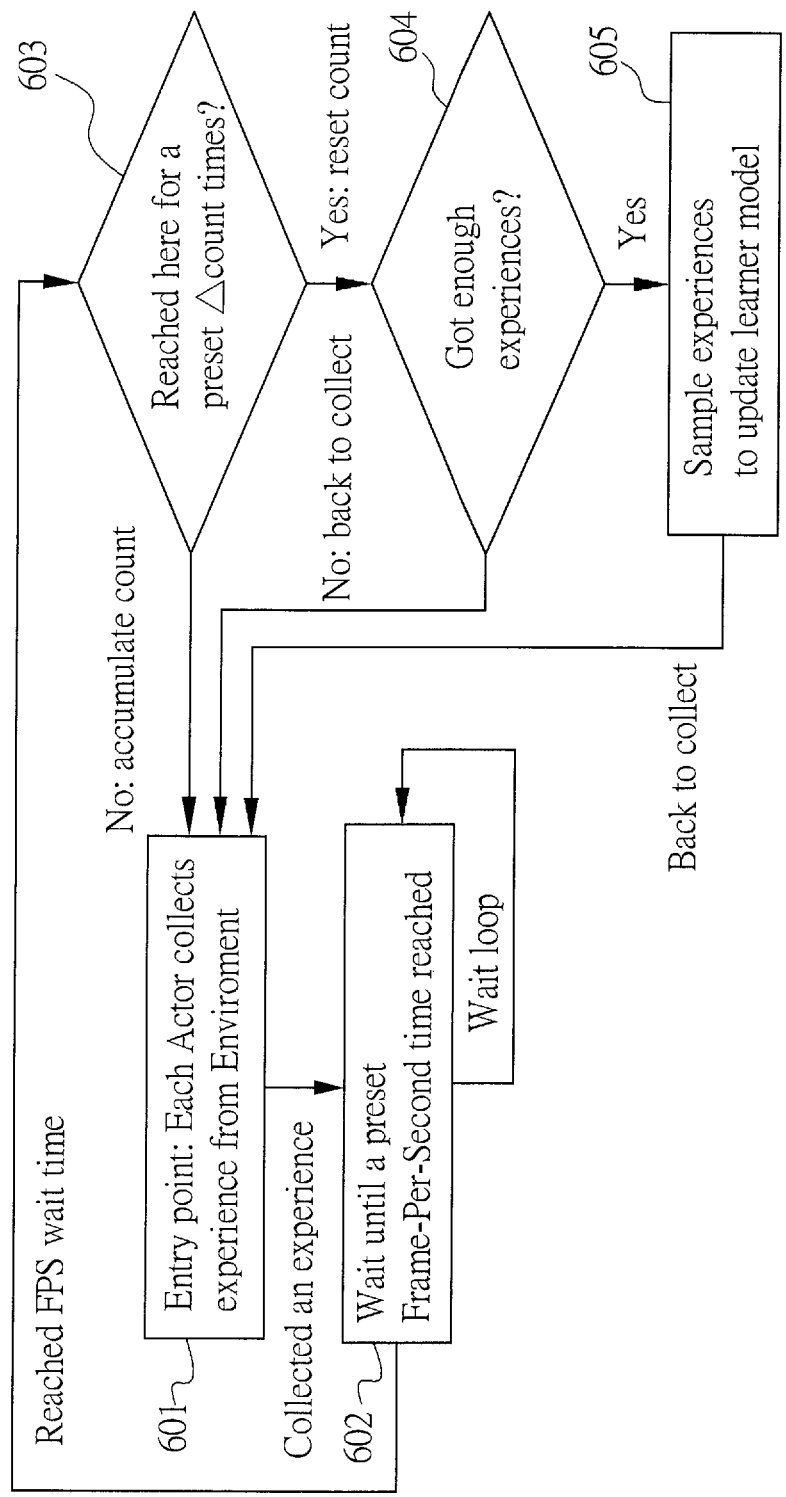
FIG. 5 is a schematic diagram showing an embodiment of flow chart for the training model of the AI client to control the experience accepting rate and sampling rate.

Please refer to FIG. 5, which is a schematic diagram showing an embodiment of flow chart for the training model of the AI client to control the experience accepting rate and sampling rate. As shown in Step 601, after each actor module 515 is connected to its own playing environment, the training process of the AI learner module 516 will start working, that is, each actor module will start collecting experiences (image frames of the second gaming output) from its connected playing environment. Then, in Step 602, whenever the actor module collects an experience from the playing environment, in addition to sending the collected experience to the reply module 518, the actor module will also wait for a preset frame-per-second (FPS) time reached before it can collect the next experience from the playing environment. This Step 602 allows the actor module to collect experiences from the playing environment under a preset FPS rate. However, it is notable that, this Step 602 may also be performed by the reply module in order to control its experience accepting rate as the preset FPS rate. And then, in Step 603, when the reply module accepts an experience from the actor module, the reply module checks whether or not a preset Δcount times value has been reached? If "NO", the preset Δcount has not been reached yet, then the reply module will accumulate the count and Step 601 will be processed again for collecting another new experience. If "YES", the preset Δcount has been reached, then the count will be reset, and the reply module will proceed with Step 604 and check whether or not enough experiences have been accepted? If "NO", the accepted experiences are not enough, then Step 601 will be processed again for collecting another new experience. If "YES", the accepted experiences are enough, then Step 605 will be processed, and the reply module will sample the experiences to update the learner module 516, and then Step 601 is processed again for collecting another new experience. The process defined in Steps 603 and 604 allow the reply module to pause the learner module and wait for the actor modules to collect enough new experiences for generating the samples.

Figure 6A:
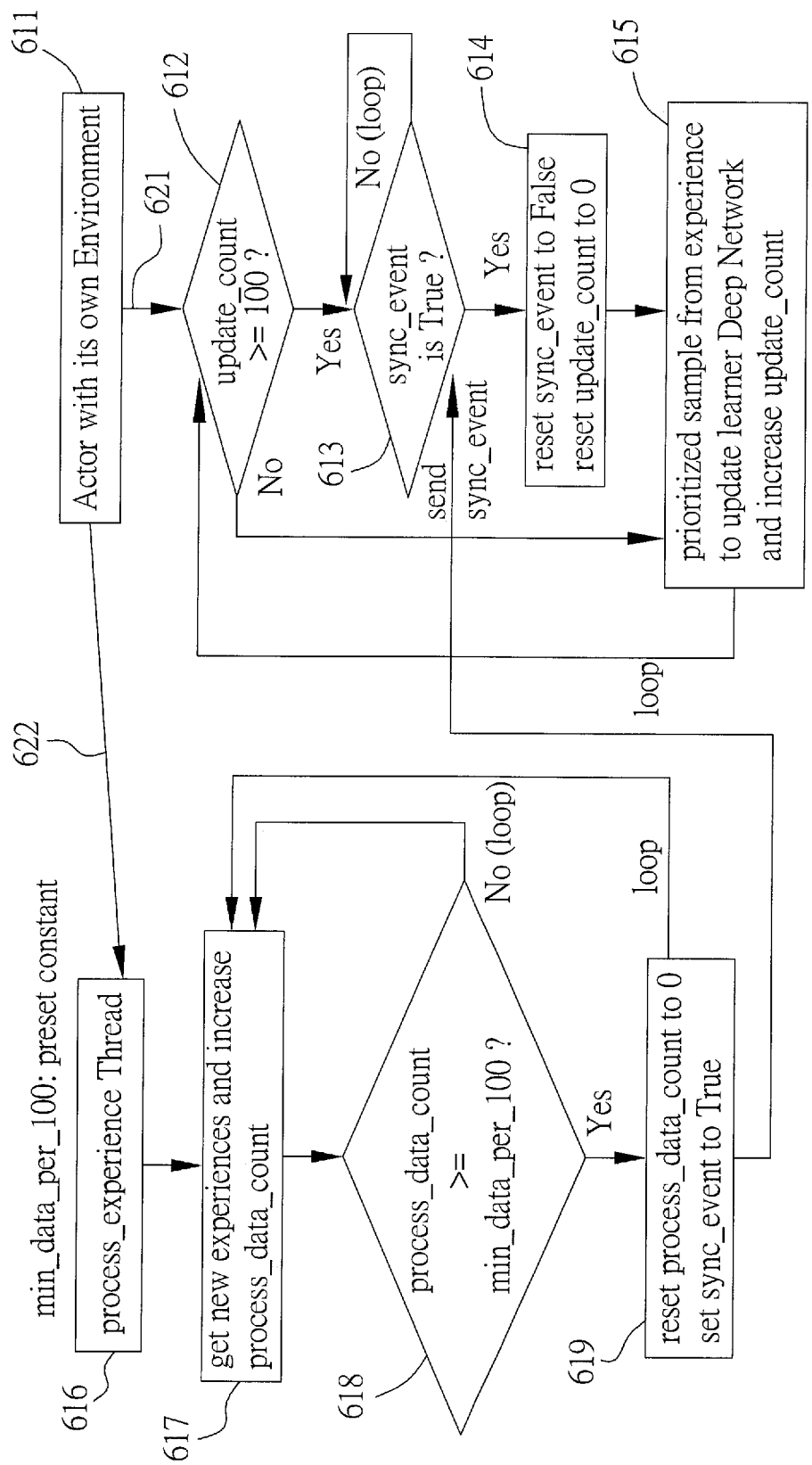
FIG. 6A is a flow chart showing an embodiment of a controlling process performed by the replay module to detect and control the sampling rate in accordance with the present invention.

The method for training AI bot in computer game in accordance with the invention adds a new parameter to control learning speed, for instance, pausing learner and waiting for actors to generate enough new data in a predefined time period. Please refer to FIG. 6A, which is a flow chart showing an embodiment of a controlling process performed by the replay module to detect and control the sampling rate in accordance with the present invention. In step 611, after each actor module 515 is connected to its own playing environment, the training process of the AI learner module 516 will start working, that is, each actor module will start sending experiences (image frames of the second gaming output) to the replay module 518 (path 621), and the replay module 518 will start generating and sending samples of received experiences to the AI learner module 516 (path 622). Then, the replay module 518 start counting and checking whether the number of updated experiences "update_count" has reached a predetermined number, for example but not limited to one hundred (see "update_count≥100?" shown in step 612). If the number of "update_count" is smaller than the predetermined number, says one hundred in this embodiment, then the replay module 518 will proceed with step 615 to generate prioritized sample from the received experience and send the prioritized sample to the AI learner module 516 in order to update the leaner Deep Network, and then, the number of "update_count" is increased by one and then go back to step 612. If the number of "update_count" is equal to or larger than the predetermined number, then the step 613 will be proceeded to check if a value "sync_event" is "True" or "False". In the meantime, the replay module 518 also start proceeding with a process experience thread procedure (see "process_experience thread" in step 616) to count the increased number of data of the obtained new experiences "process_data_count" (see "get new experiences and increase process_data_count" in step 617). Then, the replay module 518 start counting and checking whether the number of obtained new experiences "process_data_count" has reached a predetermined minimum number "min_data_per_100" (see "process_data_count ≥min_data_per_100?" shown in step 618). If the number of "process_data_count" is smaller than the predetermined minimum number "min_dataper_100", then the replay module 518 will proceed with step 617 to keep accepting new experiences and increasing the number of "process_ data_count". If the number of "process_data_count" is equal to or larger than the predetermined number "min_data_per_100", then the step 619 will be proceeded to reset the number of "process_data_count" to zero and also set the value of "sync_event" to "True", and then go to step 613 and spet 617. In step 613, if the value of "sync_event" is "True", then step 614 will be proceeded to reset the value of "sync_event" to "False" and also reset the value of "update_count" to zero and then go to step 615. if the value of "sync_event" is "False", then the replay module 518 will pause without generating any new sample until the value of "sync_event" becomes "True". That means, if the sampling rate is higher than the multiple of total experience accepting rates, the replay module 518 of the invention will temporary pause the generation of samples until the number of new experiences reaches the amount of generated samples, so as to avoid the replay module 518 to generate several samples by using the same old experience.

Figure 6B:
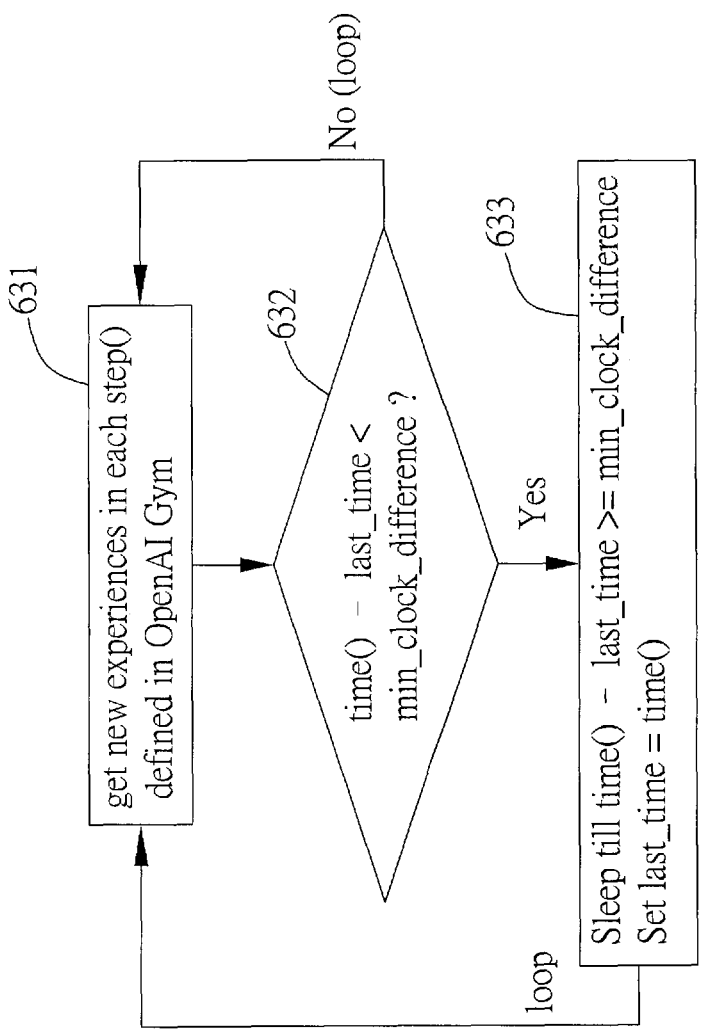
FIG. 6B is a flow chart showing an embodiment of a controlling process performed by the replay module to detect and control the experience accepting rate in accordance with the present invention.

The method for training AI bot in computer game in accordance with the invention limits the frames per second generated by the data source to prevent too many similar screens to be processed so as to save un-necessary computing power. Please refer to FIG. 6B, which is a flow chart showing an embodiment of a controlling process performed by the replay module to detect and control the experience accepting rate in accordance with the present invention. After each actor module 515 is connected to its own playing environment, the training process of the AI learner module 516 will start working, that is, each actor module 515 will start sending new experiences (image frames of the second gaming output) to the replay module 518. Then, as shown in step 631, replay module 518 gets these new experiences in each step defined in OpenAI Gym of Reinforcement Learning. Then, step 632 is proceeded to check whether the time interval "time( )-last_time" between two consequent new experiences is smaller than a predetermined minimum time interval "min_clock_difference" or not (see "time( )-last_time <min_clock_difference" in step 632) ? If "YES", then step 633 will be proceeded to pause the replay module 518 without accepting any new experience until the time interval "time( )-last_time" is equal to or larger than the predetermined minimum time interval "min_clock_difference", and then set "last_time"equal to" time( )" and go back to step 631. If "NO", then replay module 518 accepts the new experience and go back to step 631. This process allows the replay module 518 of the invention to detect and control the experience accepting rate to a predetermined range or value. It is noted that, because the controlling process shown in FIG. 6B is processed by replay module, thus, it is the experience accepting rate being controlled, and this controlling process does not influence the gaming FPS of both the player clients and actors.

In a preferred embodiment of the invention, the gaming application is an application of a car racing game. The AI learner module analyzes the image frames in order to obtain at least a velocity data and an accelerating status data of car. The AI training process uses the velocity data as the input of the AI training process in order to train the AI client to achieve a higher average velocity of car during the car racing game. Because the velocity data and accelerating status data can be obtained by analyzes the image frames without the needs to own or modify the source codes of the gaming application, thereby, the playing environment (learning environment) and the AI training agents can be decoupled, and the format of the second gaming output can be exactly the same as the format of the first gaming output.

In the invention, because player clients are decoupled from AI clients, each player client's availability, performance and resource consumption, for example quality of emitting controls and perceiving rendered observations, does not interfere with other player/AI clients. For any playing environment, AI bots can train with or without player clients. Playing environment in the server container is decoupled from player/AI connections via input and observation interfaces. Updates or on-the-fly changes of playing environment, player client, AI algorithm/inference from trained model, are mutually independent. Designated AI training to improve data efficiency: AI clients can collect feedback data from observations without rendering. They can also collect from multiple playing environment connections.

Furthermore, the invention adds a new parameter to control learning speed. For instance, pause learner and wait for actors to generate enough new data in a predefined time period. The invention also limits the FPS of environment and/or screenshots per experience in actors generating data, in order to save unnecessary computation from processing duplicated experience information. In addition to prioritize sampling all experiences as many as can, the invention explicitly controls how many data the learner will process in a specified period of time. Instead of letting the environment playing in high FPS or even super-real time, the invention explicitly limits FPS of environment in actors, and/or ignores too frequent frames in the multiple-frames-per-experience convention, before feeding into the replay experience buffer.

I. INTRODUCTION OF EXPERIMENT

In this end, the invention proposes a pure end-to-end solution for training the car racing game AI bots. The pure end-to-end means the learning algorithm uses only with the raw observations and without any information that is not provided on the observation, even for the training. For example, the training of Atari games AI bots in "Reference [1]" is trained only with the observation and the score showed on the observation.

Most of car racing games show some game information on the screen especially the velocity value. So we designed the reward function consisting only velocity value for car racing games, this makes the AI bot can be trained without using any game internal states. We use a variant of Deep Q Network (DQN) "Reference [1]" as our function approximator which includes techniques like double Q-learning, dueling network architecture and residual network architecture.

However, the most important training signal for our reward function comes from collision situations which are very sparse for agent to learn. So we use the Q learning trick, multi-step return, to accelerate the propagation of the training signal. Additionally, we use Ape-X "Reference [2]" distributed training framework, which is powerful for accelerating training speed and can also enhance the training performance in sparse training signal environment.

Moreover, we also propose limit learner rate method for Ape-X training framework to make the learning focus on the most important training data. This method greatly improves the final performance and accelerate the training speed.

Our experiment is trained on the unrealistic car racing game. This game have very complicate scene and road type which is different from the famous AI experimental game TORCS (The Open Racing Car Simulator). Our experimental results show the AI bot can achieve performance beyond the average human level and reach a level close to professional human players.

SYMBOLS USED IN EXPERIMENT s: state of the environment
a: action taken by the agent
r: reward value calculated by reward function
θ: parameter of deep Q network
θ⁻: parameter of target network (a slow moving copy of deep Q network)
$Q_\theta(s,a)$: expected future return calculated by deep Q network
$Q_\theta^-(s,a)$: expected future return calculated by target network
γ: discount factor that determine the importance of future reward
α: hyper parameter of modifying priority of experience
β: hyper parameter of modify the degree of importance sampling
δ: a small number to avoid dividing by zero
ϵ: probability of conducting an exploration
K: ratio of learner update rate based on data collection rate

II. BACKGROUND OF EXPERIMENT

First, we will introduce two different styles of car racing game. Next, we will discuss some relative works and compare theirs with ours.

2.1 Style of Car Racing Game 2.1.1 Realistic Car Racing Game and Unrealistic Car Racing Game There are two major types of car racing game, one is realistic car racing game and the other is unrealistic car racing game, each of them has its own fascinating features.

A realistic car racing game is a kind of game that focuses on realizing the reality and physical features of the real world. Its road style is simple and clear just like the real world. This type of game not only entertains human players, but also be useful for AI research. Driving data from real world is hard to be collected for AI bot training, not to mention training AI bot in the real world through deep reinforcement learning methods, it will cause many expensive trial-and-errors. Therefore, we use the realistic car racing game as the simulator for AI research. TORCS (The Open Racing Car Simulator) and WRC6 (World Rally Championship 6) is two famous realistic games for AI research.

An unrealistic car racing game is a kind of game that focuses on entertainment. Its road type is complex and diverse, which is hard for AI to learn. Moreover, most of these games can use props to sprint or bother competitors, which increase the difficulty for learning. Velocity is usually displayed on the screen, so we can use it for training our AI bot. In this thesis, we will focus on training AI on a kart racing game from Ubitus Inc. which is an unrealistic car racing game.

2.2 Relative Works 2.2.1 Tradition Solution for Car Racing Game AI Bot

Traditionally, the car racing game AI bot uses rule-based methods to play the game. The most common rules consist velocity, car facing angle and the distance from the middle of the road. The major concept of these rules is to tell the AI hot to drive follow the road center. This kind of AI bot is lack of playing style and need to use game internal states for building the rule. However, game internal states are not easy to get without owning the game program.

2.2.2 End-to-End Solution for Car Racing Game AI Bot

End-to-end training means using only raw observations for training AI bot without using any other game internal states. In the past works of end-to-end training for car racing game AI bot, they are able to use raw image as the only model input to make decision. However, they both need to use game internal states for building the reward function, which is not worked without owning game program. Moreover, they both focused on realistic car racing games, which are different from ours.

Mnih et al. "Reference [2]"0 used distributed deep reinforcement learning method A3C to train AI bot on TORCS. The reward is proportional to the agent's velocity along the middle of the road at the agent's current position. The trained AI bot can achieve between roughly 75% and 90% of the score obtained by human testers. However, they need to use car facing angle for building the reward function.

Etienne et al. "Reference [6]" used A3C to train AI bot on realistic game WRC6. The reward function is different from the one in "Reference [2]"0. They modified the reward function by adding the distance from the middle of the road as penalty. The purpose is to make the car not to drift too far from the middle of the road. At last, the results show that the AI bot can finish almost 90% of the challengeable track outperformed the using of previous reward function. However, to build this kind of reward function, they need to get car facing angle and the distance from the middle of the road from game environment.

III. METHODOLOGY

We will describe our model structure and used techniques in section 3.1 and the design of our reward function in section 3.2. Next, we will introduce Ape-X distributed training framework and some detail setting in section 3.3. In the section 3.4, we will describe the proposed limit learner rate method that helps improving performance and training speed.

3.1 DQN for Car Racing Game

In this section, we will introduce our neural network model design and all used techniques including: 1. Deep Q Network; 2. Double DQN; 3. Multi-step return; 4. Dueling network architecture; and 5. Residual network architecture.

3.1.1 Deep Q Network (DQN)

DQN "Reference [1]"0 is a deep reinforcement learning method that combined Q-learning with deep neural network. The job of model is to predict expected future return for specific action and the symbol is $Q(s_t, a_t|\theta)$ where $S_t$ is the state at time step t, $a_t$ is the selected action at time step t and θ is the network parameters. The best action is the one with maximum Q value under same given state.

The goal of AI bot is to maximize the expected discounted future return $R_t = \Sigma_{i=t}^{T} \gamma^{i-1} T_i$. In this formula, $\gamma \in [0, 1]$ is a discount factor that trade-off the importance between immediate reward and future rewards, and T represents the termination state of the episode.

We optimize the DQN by minimizing the following loss functions:

$$L(\theta) = E_{s,a,r,s'}\left[(R_t^{DQN} - Q(s_t, a_t \mid \theta))^2\right] \quad (1)$$

$$R_t^{DQN} = r_t + \gamma \max_{a'} Q(s_t, a' \mid \theta^-) \quad (2)$$

Where $\theta^-$ represents the parameters of a fixed and separate target network. A key innovation in "Reference [1]"0 was to freeze the parameters of the target network $Q(s_t,a_t|\theta^-)$ for a fixed number of iterations while updating the online network $Q(s_t,a_t|\theta)$ by gradient descent. (This greatly improves the stability of the algorithm.) The specific gradient update is $$\nabla_\theta L(\theta) = E_{s,a,r,s'}[(R_t^{DQN} - Q(s_t,a_t|\theta))\nabla_\theta Q(s_t,a_t|\theta)] \quad (3)$$

DQN is an off-policy algorithm which means it can reuse out-of-date experience for training. For an off-policy learning algorithm, an experience replay is commonly used to store experiences for future training. An experience consists of a 4-tuple ($s_t$, $a_t$, $r_t$, $s_{t+1}$), including a state $s_t$, an action $a_t$, a reward $r_t$ at time t, a next state $s_{t+1}$ at time (t+1). During training, experiences are uniformly sampled to form a batch of training data and the gradients for updating are averaged over the whole batch.

3.1.2 a Variant of DQN

We use a variant of DQN in our experiments with some of the components of Rainbow "Reference [5]"0. Including double Q-learning "Reference [6]" with multi-steps bootstrap targets as the learning algorithm, and a dueling network "Reference [7]" architecture combine with residual network "Reference [9]"0 architecture as the function approximator $Q(S_t,a_t|\theta^-)$. The resulting loss function is as following:

$$R_t = r_{t+1} + \gamma r_{t+2} + \ldots + \gamma^{n-1} r_{t+n} + \gamma^n Q(s_{t+n}, \operatorname*{argmax}_a Q(s_{t+n}, a \mid \theta) \mid \theta^-) \quad (4)$$

Instead of using Q function to approximate the future return of state $s_{t+1}$, multi-steps bootstrap change to approximate the future return of state $s_{t+n}$ and the former part use ground truth reward collected by the agent. Double Q-learning means not to use the maximum value of target network $Q(s_t,.|\theta^-)$ directly, but to use the value calculate by the target network where the action is determined by the behavior network using the formula: $\operatorname{argmax}_a Q(s_t,a|\theta)$.

3.1.3 Neural Network Design for DQN

Figure 7:
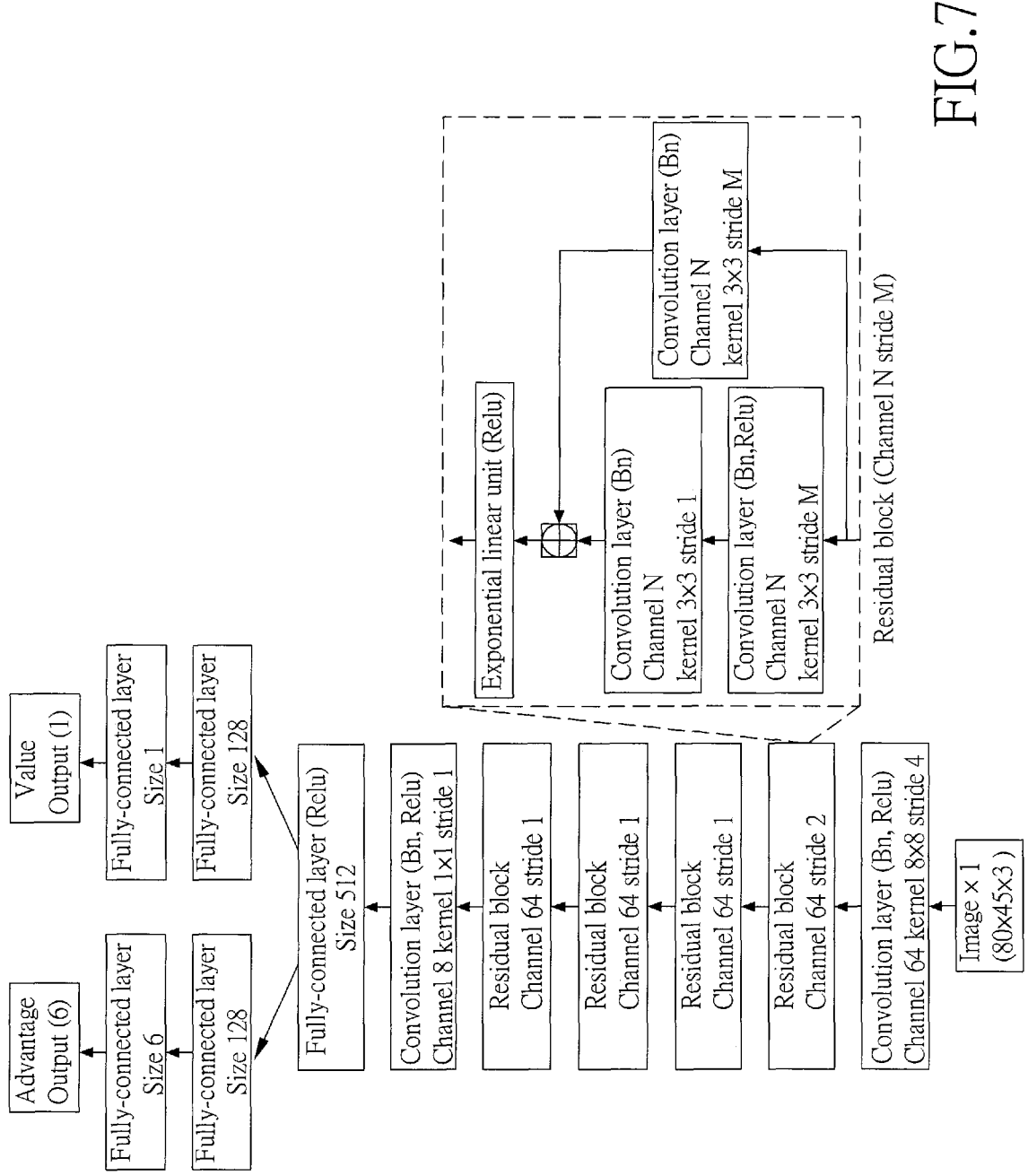
FIG. 7 is a schematic diagram showing an embodiment of the design of the neural network model in accordance with the invention.

We use one convolutional layer followed by four residual blocks and one convolutional layer all with channel 64 as the feature extraction layers. Next, the extracted feature map will be fed into one fully connected layer with size 512 and then split into advantage head and state value head. The detailed architecture is showed in FIG. 7, which is a schematic diagram showing an embodiment of the design of the neural network model in accordance with the invention.

The reason why we use only single frame as model's input instead of four stacked frames is that CNN (Convolutional Neural Network) model can extract relative velocity concept from only single frame according to the distance between the car and the lower bound of the screen in our game environment. So, the CNN model can use this concept to decide whether to accelerate or not.

Figure 8:
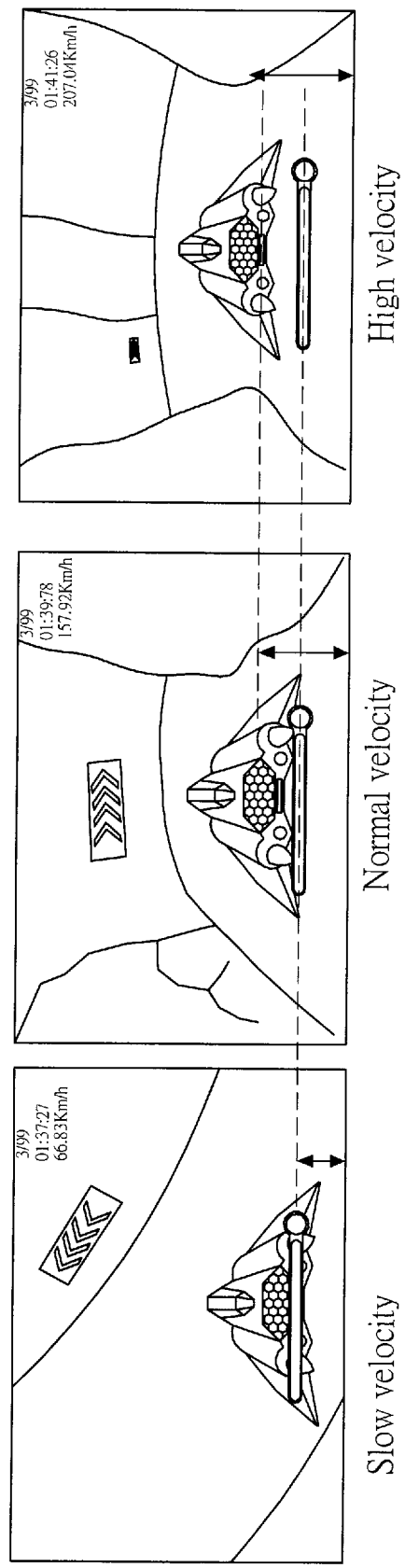
FIG. 8 is a schematic drawing showing several examples of how to determine the accelerating states of car by analyzing the distances between the car and the lower bound of the screen in a car racing game.

Please refer to FIG. 8, which is a schematic drawing showing several examples of how to determine the accelerating states of car by analyzing the distances between the car and the lower bound of the screen in a car racing game. The AI client of the invention can determine the status of accelerating status and the relative speed of car based on the distance between the lower end of car and the lower boundary of the screen by analyzing merely one single image frame generated by the gaming environment. In another embodiment of the invention, because almost all of the car racing games will display the speed value of car directly on the screen, as the one shown on the right-top corner of each screen shown in FIG. 8; thereby, the AI client can also directly acquire the speed value by analyzing the digits and/or texts shown on the right-top corner of the received image frame.

3.1.4 Prioritized Experience Replay for DQN

Previous work by "Reference [9]"0 proposed a method called "prioritized experience replay" (PER) to sample the experiences with different priorities. They use PER in DQN "Reference [1]"0 to improve the learning speed and the convergence performance.

According to their paper, experiences with high prediction error may contribute more knowledge for learning, so the sampling probability is proportional to the prediction error. The sampling probability of each experience is calculated according to Equation (5) and (6) and the exponent $\alpha$ controls how much prioritization is used, with $\alpha=0$ corresponding to uniform sampling. However, modifying the sampling probability of experiences will introduce bias to the expectation of Q value, so PER use importance sampling to leverage this problem. Equation (7) shows how to fix the gradient with importance sampling, the exponent $\beta$ controls the degree of importance sampling. Generally, $\beta$ is linearly annealed from its initial value $\beta_0 < 1$ to 1 and N is the number of transitions.

$$\text{Prediction error } p_1 = |r - Q(s_t, a_t)| + \delta \quad (5)$$

$$\text{Sample probability } P(i) = \frac{(p_i)^\alpha}{\sum_k (p_k)^\alpha}, \alpha \in [0, 1] \quad (6)$$

$$\Delta\theta = \sum_i \left[\left(\frac{1}{N} * \frac{1}{P(i)}\right)^\beta \Delta\theta\right], \beta \in [0, 1] \quad (7)$$

3.2 the Design of Reward Function

We build the reward function consisting only velocity value which is the only information we can extract from raw observation. To extract velocity from raw observation, we train a digit recognition network for extraction task.

The concept of our reward function is to punish all accidents that seriously decrease velocity, such as collisions, and encourage AI to drive faster. We also use early stopping method that we terminate the episode immediately when the velocity remains low after several actions done. The designed reward function is as following:

If the velocity decreases substantially: (view as collision, high penalty)

reward=−10+Δvelocity/5 terminate=True else if velocity remains slow after several actions done:
  (too slow, low penalty)
  reward=−1
  terminate=True
else: (run fast, low benefit)
  reward=velocity/100

The most important training signal comes from collisions, which are very sparse to get. So, the use of multi-steps return and Ape-X training framework can make our AI bot learn the important training signal faster.

3.3 the Ape-X Training Framework 3.3.1 Ape-X Framework for DQN

We use Ape-X distributed training framework proposed by "Reference [2]". The framework is powerful at sparse training signal environment, because the architecture relies on prioritized experience replay to focus on the most significant data generated by the actors. Furthermore, we use different exploration strategy for each actor to increase the diversity of collected data. We implement the Ape-X distributed training framework on single machine with GPU Titan-X. The difference is that we let learner process maintains the shared prioritized replay buffer and calculates the initial priority of every new arrived transition. The training framework is showed in FIG. 9, which is a schematic diagram of an original design of a distributed training model of the AI client in accordance with the present invention.

Figure 9:
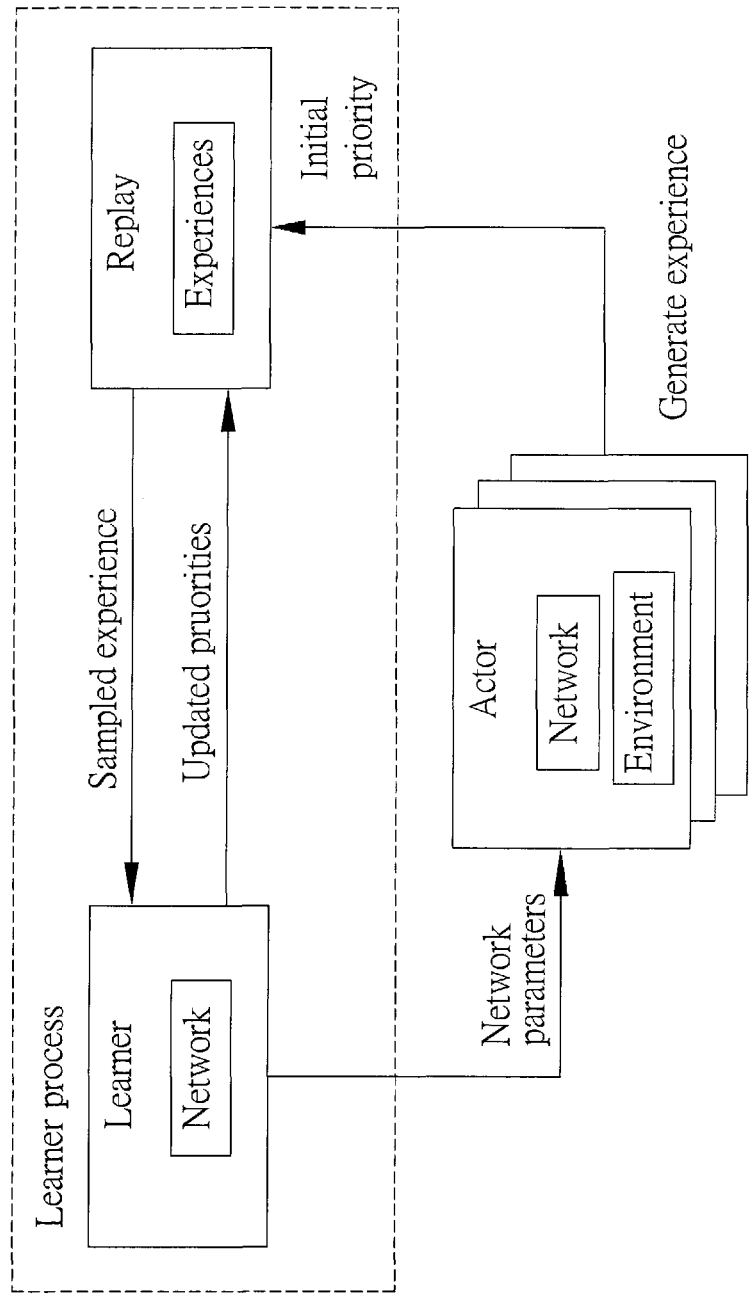
FIG. 9 is a schematic diagram of an original design of a distributed training model of the AI client in accordance with the present invention.

For the learner part in in FIG. 9, the learner is a single process that keeps sampling data from the shared prioritized replay buffer and updating the DQN parameters by using GPU. The learner also maintains the priority of each transition in the replay buffer. For the actor part in FIG. 9, multiple actors collect training data by interacting with the environment in the same time and put the collected data into the shared replay buffer. Every actor will copy the new DQN parameters from the learner process periodically.

In principle, both acting and learning may be distributed across multiple workers without high-lever synchronization. In our experiments, twelve actors run on CPUs to generate data concurrently, and a single learner keeps updating the DQN parameters using a GPU Titan X.

3.3.2 Different Epsilon Greedy for Actors

To improve the exploration ability, we use the same idea proposed by "Reference [2]". They used different exploration strategy for each actor by assigning different $\epsilon$-greedy rate. Each actor $i \in \{0, \ldots, N-1\}$ executes an $\varepsilon_i$-greedy policy, where $$\varepsilon_i = \varepsilon^{1+\frac{i}{N-1}*\alpha},$$

and $\epsilon$=0.4 and $\alpha$=7 in our experiments. To further improve the initial training speed, we can set the initial $\in_i^0$ to 1.0 and linearly decay to $\epsilon_i$ in earlier part of training.

3.4 Limit Learner Rate Method

The experimental result of the paper "Reference [2]"0 shows that more actors to collect data simultaneously will improve the training speed and the training performance of AI bot. This result shows higher data collection rate can introduce higher performance though the learner's updating rate is the same. The reasons of providing better final performance is that the refresh rate of prioritized experience replay is much faster under same learner's updating rate. It means the most important data will still be select for training first, and the bad data will be ignored because of high refresh rate of prioritized replay buffer.

We propose limit learner rate method that limits the learner's updating rate to have the same effect of high refresh rate for prioritized replay buffer under same data collection rate. The benefits of this method are:
Prevent from falling into local optimal;
Prevent from using less important data for updating;
Propagate important but sparse training signal faster.

In most of DRL experiments, the learner's update rate is much faster than the data collection rate. This means that we can perform multiple training updates on a single batch before the newest collected data can form a single batch. In this method, the data collection rate is fixed and we set the learner's updating rate to the proportional of the data collection rate.

learner update rate <data collection rate*K, where K is the coefficient that determines the learner's updating rate. We tested four different coefficients K in our experiments and the result showed proper K can introduce better training efficiency and training performance.

Figure 10:
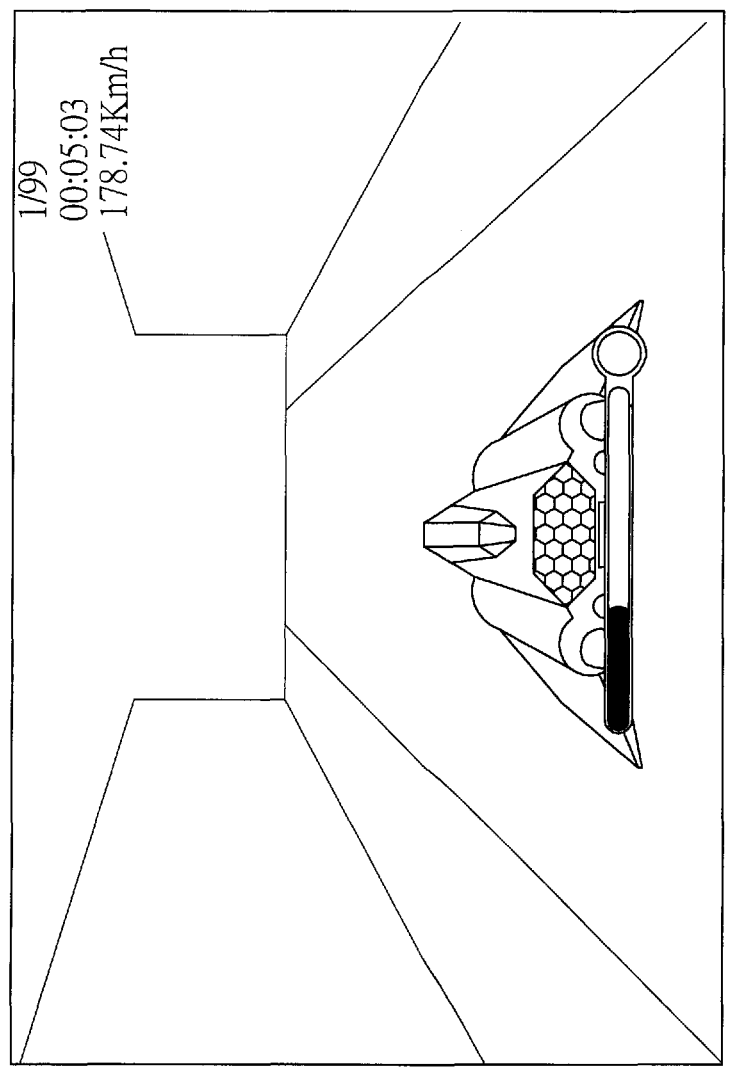
FIG. 10 is a schematic drawing of an image of kart racing game provided by Ubitus Inc.

IV. EXPERIMENTS 4.1 Experiment Environment and Setup 4.1.1 Car Racing Game: Kart In our experiments, we used unrealistic car racing gam kart from Ubitus Inc. (see FIG. 10, which is a schematic drawing of an image of kart racing game provided by Ubitus Inc.) for our AI bot training. The view and the road type of this game is more complex than the realistic car racing game, such as TORCS. The images observed from environment was reshaped from 640×480 to 80×45, and each pixel in the image was normalized to [−1, 1] by $$\left(\frac{x}{255} - 0.5\right)*2$$

before feeding into DQN. The action space of the game is the combination of (Left, None, Right) and (Accelerate, None). So, the number of valid actions is six.

4.2 Performance

In this section, we will show and discuss our experimental results. Including the performance comparison between AI bot and human players, the experiment of different learner's updating rate and the experiment of different input frame number.

4.2.1 Overview Performance of Our DQN

Figure 11:
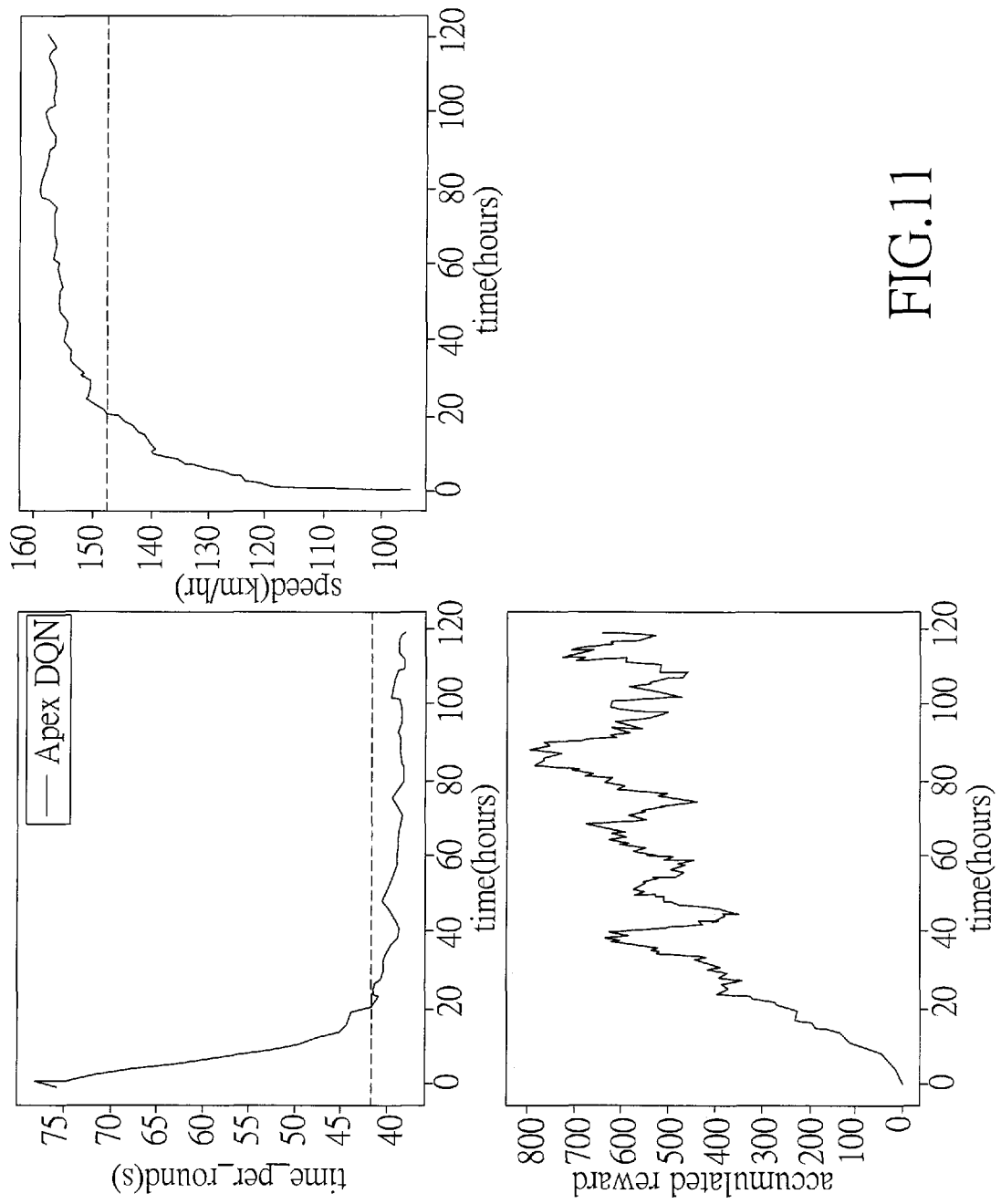
FIG. 11 is a schematic diagram showing the training curve of the method for training AI bot in computer game according to the invention.

The training curve is showed in FIG. 11, which is a schematic diagram showing the training curve of the method for training AI bot in computer game according to the invention. The dotted horizontal line indicates the average performance of human tester. We can see that our AI bot plays better than the average performance of human tester after training for 24 hours.

4.2.2 Comparison with Human Tester

We compared our AI bot performance with human players and professional players, the result is showed in Table 1 below. In assessing the performance of human players, all human players were told to play carefully and intensively. The total number of rounds collected by human players is 223, and we calculated the average speed and average round time of these data. The performance of professional players is the average of top 10% of all data ranked by round time. The performance of our AI bot is the average over recent 20 rounds. The experimental result shows our AI bot can play better than the average performance of human tester and the time difference is small compared to professional players.

TABLE 1

The comparison with human player. The professional players is the top 10% of all players ranked by round time.

|  | All players | Professional players | Our approach |
|---|---|---|---|
| Average speed (km/hr) | 148.1 | 170.4 | 160.5 |
| Average round time (sec) | 41.9 | 35.4 | 37.4 |
| Data size (rounds) | 223 | 22 | 20 |

4.3 Evaluate Different Learner Rate

Figure 12:
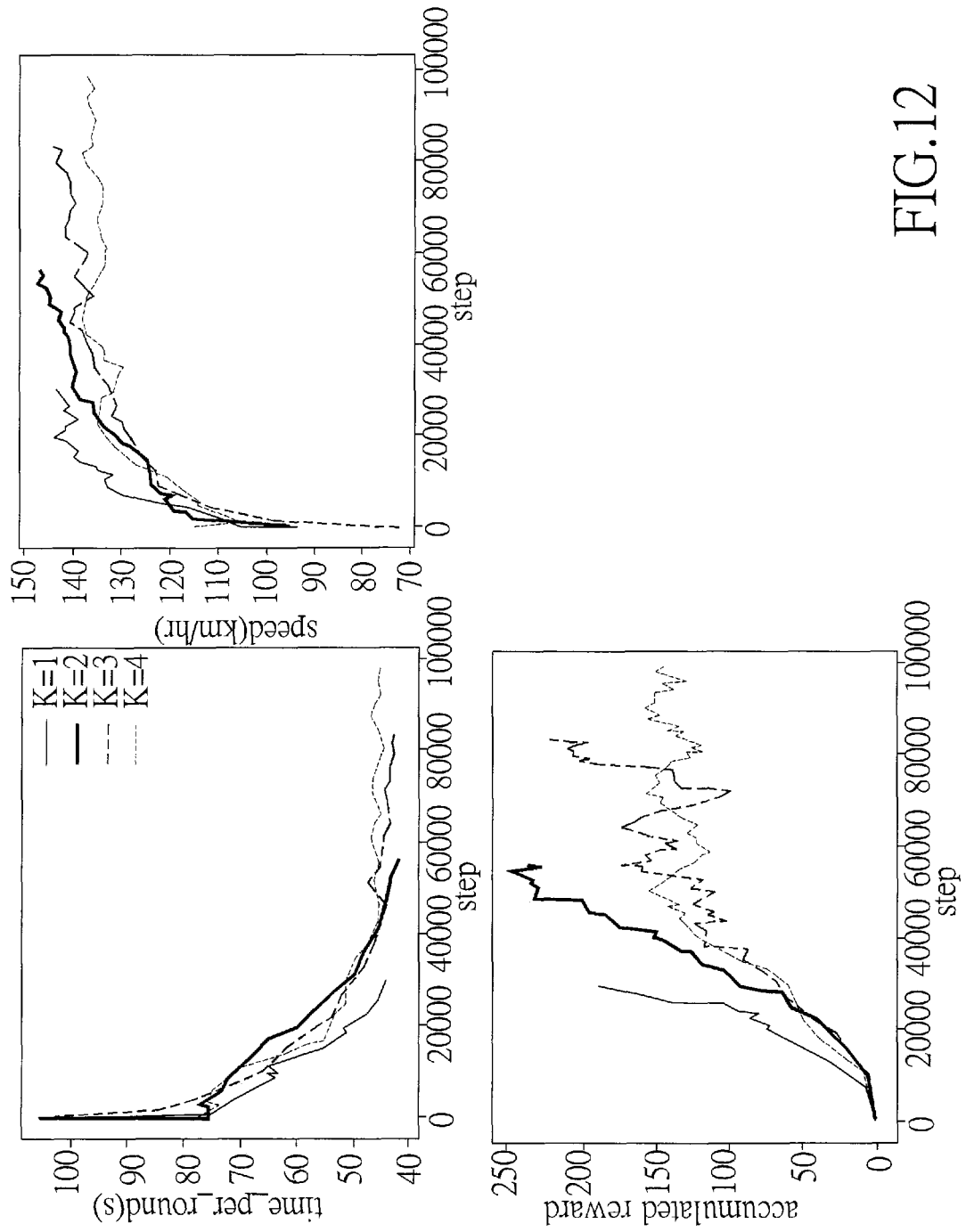
FIG. 12 is a schematic diagram showing the training curve of different learner rate in the experiment of the present invention.

We also did the experiment to evaluate the impact of different learner's updating rate for 20 hours under same data collection rate (we use 12 actor to collect data in the same time). Here, we evaluated four different learner's updating rates K=1, K=2, K=3 and K=4, where K represents the ratio of learner's updating rate based on data collection rate. Different learner's updating rate will have different update steps under the same training time. The experimental result is showed in FIG. 12, which is a schematic diagram showing the training curve of different learner rate in the experiment of the present invention. We can see that the lower the learner's updating rate, the better the performance under same update steps. The reason is that the refresh rate of prioritized replay buffer is increased, so the probability of sampling important training data for updating is also increased. If the sampling probability of important training data is already very high, there is no need to reduce the learner's update rate. Otherwise, training time will increase without improving the performance. In other words, the training efficiency will decrease. Therefore, properly selecting the learner's updating rate can speed up the training converge time and improve the final performance.

Figure 13:
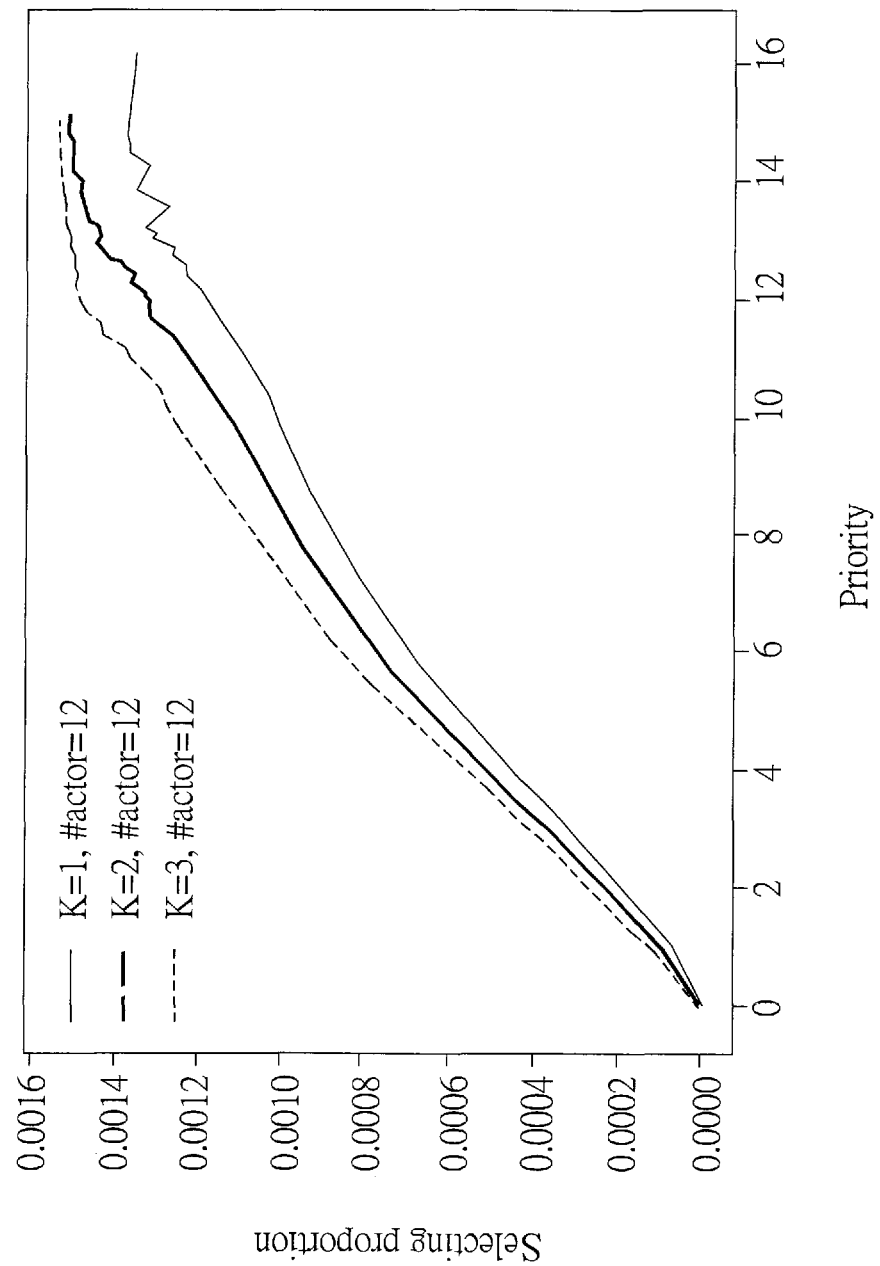
FIG. 13 shows the selecting proportion of every initial priority in the experiment of the present invention.

We also recorded all transition sampling times during training and to see exactly what the difference between the different K is. FIG. 13 shows the selecting proportion of of every initial priority in the experiment of the present invention. The result is 20000 updating times of learner, and it shows the lower learner updating's rate can make the learner to use more high priority transition for updating. The reason we didn't evaluate K=4 case is because recording things during training greatly decrease the learner's updating rate. So, the unlimited learner's updating rate is roughly K=3.5 which is lower than K=4 case.

4.4 Evaluate Different Input Frame Number

Figure 14:
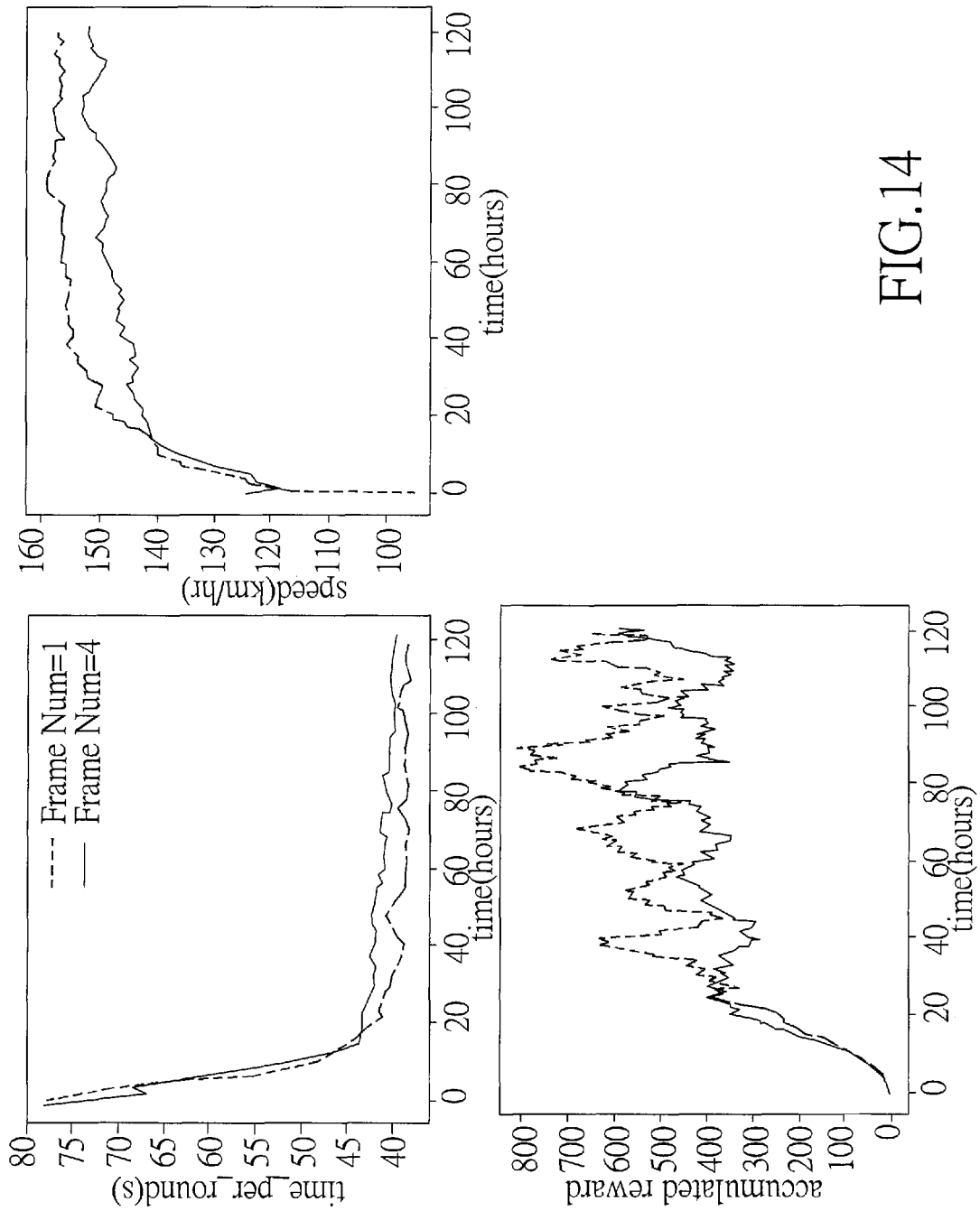
FIG. 14 is a schematic diagram showing the training curve of different frame stacked number in the experiment of the present invention.

In this section, we evaluated the training performance of different input frame stacked numbers (detail is in section 3.1.3). The reason why we use one frame in our major experiment is that the relative velocity concept can be extract by CNN model in our game environment. As shown in FIG. 14, which is a schematic diagram showing the training curve of different frame stacked number in the experiment of the present invention, the experimental result also shows the training performance of one frame input is much better than the four stacked frames, because the four stacked frames setting means the model need to learn four times larger input dimension. But, this is the special case in our game design, In most racing games, we still need to use multiple stacked frames as model input or use the recurrent network to save previous information.

V. CONCLUSION 5.1 Conclusion

We proposed a pure end-to-end training solution for car racing game AI bot that use only raw image for both training and testing time. First, we propose the reward function consisting only velocity for training car racing game AI bot. Next, we use Ape-X distributed training framework combined with Dueling Double DQN to solve the sparse training signal problem caused by the reward function we designed. We further propose limit learner rate method that greatly improve the final performance and training speed in our experiment. At last, we compare our AI bot with human players, the performance of our AI bot can exceed the average performance of human players and only get a small time difference from the top 10% of human players.

While the present invention has been particularly shown and described with reference to a preferred embodiment, it will be understood by those skilled in the art that various changes in form and detail may be without departing from the spirit and scope of the present invention.

VI. REFERENCES

Reference [1]: Volodymyr Mnih, Koray Kavukcuoglu, David Silver, Andrei A. Rusu, Joel Veness, Marc G. Bellemare, Alex Graves, Martin Riedmiller, Andreas K. Fidjeland, Georg Ostrovski, Stig Petersen, Charles Beattie, Amir Sadik, Ioannis Antonoglou, Helen King, Dharshan Kumaran, Daan Wierstra, Shane Legg & Demis Hassabis, Human-level control through deep reinforcement learning, Nature 2015

Reference [2]: Dan Horgan, John Quan, David Budden, Gabriel Barth-Maron, Matteo Hessel, Hado van Hasselt, David Silver, Distributed Prioritized Experience Replay, ICLR 2018.

Reference [3]: Volodymyr Mnih, Adria Puigdombnech Badia, Mehdi Mirza, Alex Graves, Timothy P. Lillicrap, Tim Harley, David Silver, Koray Kavukcuoglu, Asynchronous Methods for Deep Reinforcement Learning, ICML 2016.

Reference [4]: Etienne Perot, Maximilian Jaritz, Marin Toromanoff, Raoul De Charette, End-to-End Driving in a Realistic Racing Game with Deep Reinforcement Learning, CVPR 2017 workshop.

Reference [5]: Matteo Hessel, Joseph Modayil, Hado van Hasselt, Tom Schaul, Georg Ostrovski, Will Dabney, Dan Horgan, Bilal Piot, Mohammad Azar, David Silver, Rainbow: Combining Improvements in Deep Reinforcement Learning, arXiv preprint arXiv: 1710.02298.

Reference [6]: Hado van Hasselt, Arthur Guez, David Silver, Deep Reinforcement Learning with Double Q-learning, AAAI 2016.

Reference [7]: Ziyu Wang, Tom Schaul, Matteo Hessel, Hado van Hasselt, Marc Lanctot, Nando de Freitas, Dueling Network Architectures for Deep Reinforcement Learning, ICML 2016.

Reference [8]: Kaiming He, Xiangyu Zhang, Shaoqing Ren, Jian Sun, Deep Residual Learning for Image Recognition, arXiv preprint arXiv:1512.03385.

Reference [9]: Schaul, T., Quan, J., Antonoglou, I., & Silver, D. (2015). Prioritized experience replay. arXiv preprint arXiv: 1511.05952.

What is claimed is:

1. A method for training AI bot in computer game, comprising:
executing a gaming application in a server; said executed gaming application generating a playing environment which is capable of accepting at least a player client to connect to the playing environment via a communicating network; said playing environment being able to receive a player command from the player client, generate a first gaming output according to the received player command, and transmit said first gaming output to the player client via the communicating network;

executing an AI (artificial intelligence) training application; said AI training application comprising at least one actor module and an AI learner module; wherein, when said AI training application is executed, each said actor module generates an AI client for connecting to the playing environment and sending an AI playing command to the playing environment generated by said gaming application, and said playing environment generates a second gaming output according to the AI playing command and sends the second gaming output to the actor module; wherein said first and second gaming outputs both comprise perceiving rendered observations which are transmitted as a video stream containing a sequence of image frames;

said AI learner module executing an AI training process which retrieves said image frames of said second gaming output from the actor module and uses at least one of said image frames of said second gaming output as an input of the AI training process and then generates a feedback command according to the input; said AI learner module sequentially analyzing the image frames of said second gaming output in order to obtain parameters required for proceeding with the AI training process; said actor module accepting said feedback command from said AI learner module and generating said AI playing command according to the said feedback command; and then, said generated AI playing command being sent to the playing environment in order to generate a consequent image frame of said image frames of said second gaming output to be input to the AI training process again as a training loop for training the AI client;

wherein, said AI training application is independent from the gaming application and can be executed without the need to modify the gaming application nor obtain additional data from the gaming application other than the second gaming output; moreover, a format of the image frames of the second gaming output is the same as the format of the image frames of the first gaming output;

wherein said gaming application is an application of a car racing game; said AI learner module analyzes the image frames of the second gaming output in order to obtain at least a velocity data and an accelerating status data of car; said AI training process uses said velocity data as the input of the AI training process in order to train the AI client to achieve a higher average velocity of car during the car racing game;

wherein, each said image frame comprises a boundary of screen and a pattern of car located inside the boundary of screen; the AI client determines the accelerating status data and the relative velocity data of car based on the distance between a lower end of the pattern of car and a lower boundary of the boundary of screen by analyzing merely one single said image frame of the second gaming output generated by the playing environment.

2. The method of claim 1, wherein said playing environment is able to be connected by both the player client and the AI client in the same time, such that the player client and the AI client can play in the playing environment in the same time while the AI training process is still running for training the AI client.

3. The method of claim 1, wherein said playing environment is able to be connected by the AI client without any said player client being connected, such that the AI training process is executed for training the AI client in a condition without any said player client being connected in the same playing environment.

4. The method of claim 1, wherein, in addition to said second gaming output, said first gaming output is also fed to the AI learner module as the input of the AI training process for training the AI client.

5. The method of claim 1, wherein, there are two or more gaming applications being executed in the server for generating two or more said playing environments;

in addition, said AI training application comprises two or more said actor modules;

each said actor module connecting to a corresponding said playing environment, sending said AI playing command to said corresponding playing environment, and receiving said second gaming output from said corresponding playing environment;

said AI learner module retrieving said second gaming outputs from the actor modules and uses said second gaming outputs as inputs of the AI training process.

6. A method for training AI bot in computer game, comprising:

executing a gaming application in a server; said executed gaming application generating a playing environment executing an AI (artificial intelligence) training application; said AI training application comprising two or more actor modules and an AI learner module; wherein, when said AI training application is executed, each said actor module generates an AI client for connecting to the playing environment and sending an AI playing command to the playing environment generated by said gaming application, and said playing environment generates a second gaming output according to the AI playing command and sends the second gaming output to the actor module; wherein said second gaming output comprises perceiving rendered observations which are transmitted as a video stream containing a sequence of image frames;

said AI learner module executing an AI training process which retrieves said image frames of said second gaming output from the actor module and uses at least one of said image frames of said second gaming output as an input of the AI training process and then generates a feedback command according to the input; said AI learner module sequentially analyzing the image frames of said second gaming output in order to obtain parameters required for proceeding with the AI training process; said actor module accepting said feedback command from said AI learner module and generating said AI playing command according to the said feedback command; and then, said generated AI playing command being sent to the playing environment in order to generate a consequent image frame of said image frames of said second gaming output to be input to the AI training process again as a training loop for training the AI client;

wherein, said AI training application further comprises a replay module and a storage; said storage receives and stores experience data generated by each said actor module according to the second gaming output in an experience accepting rate; said replay module generates samples of the experience data stored in the storage, and sends said generated samples to the AI learner module as said input of the AI training process in a sampling rate controlled by the replay module;

wherein, when the sampling rate is higher than a multiple of total experience accepting rates of said actor modules, the replay module temporary pauses the generation of samples in order to decrease the sampling rate until the sampling rate is equal to or lower than the multiple of total experience accepting rates;

wherein said gaming application is an application of a car racing game; said Al learner module analyzes the image frames of the second gaming output in order to obtain at least a velocity data and an accelerating status data of car; said Al training process uses said velocity data as the input of the Al training process in order to train the Al client to achieve a higher average velocity of car during the car racing game;

wherein, each said image frame comprises a boundary of screen and a pattern of car located inside the boundary of screen: the Al client determines the accelerating status data and the relative velocity data of car based on the distance between a lower end of the pattern of car and a lower boundary of the boundary of screen by analyzing merely one single said image frame of the second gaming output generated by the playing environment.

7. The method of claim 6, wherein said playing environment is capable of accepting at least a player client to connect to the playing environment via a communicating network; said playing environment being able to receive a player command from the player client, generate a first gaming output according to the received player command, and transmit said first gaming output to the player client via the communicating network;

wherein, said Al training application is independent from the gaming application and can be executed without the need to modify the gaming application nor obtain additional data from the gaming application other than the second gaming output; moreover, a format of the second gaming output is exactly the same as the format of the first gaming output.

8. The method of claim 7, wherein said playing environment is able to be connected by both the player client and the Al client in the same time, such that the player client and the Al client can play in the playing environment in the same time while the Al training process is still running for training the Al client.

9. The method of claim 7, wherein said playing environment is able to be connected by the Al client without any said player client being connected, such that the Al training process is executed for training the Al client in a condition without any said player client being connected in the same playing environment.

10. The method of claim 7, wherein, in addition to said second gaming output, said first gaming output is also fed to the Al learner module as the input of the Al training process for training the Al client.

11. The method of claim 7, wherein, there are two or more gaming applications being executed in the server for generating two or more said playing environments; in addition, said Al training application comprises two or more said actor modules; each said actor module connecting to a corresponding said playing environment, sending said Al playing command to said corresponding playing environment, and receiving said second gaming output from said corresponding playing environment; said Al learner module retrieving said second gaming outputs from the actor modules and uses said second gaming outputs as inputs of the Al training process.

* * * * *